US011803629B2

(12) United States Patent
Ko et al.

(10) Patent No.: US 11,803,629 B2
(45) Date of Patent: Oct. 31, 2023

(54) SYSTEMS, METHODS, AND MEDIA FOR OBFUSCATED PERSONAL IDENTIFICATION NUMBER ENTRY ON MEDIA DEVICES

(71) Applicant: Google LLC, Mountain View, CA (US)

(72) Inventors: Jiyoung Ko, Cliffside Park, NJ (US); Austin Quaid Walker, San Francisco, CA (US); Saleh Altayyar, Modesto, CA (US); Sourav Basu, Fremont, CA (US)

(73) Assignee: Google LLC, Mountain View, CA (US)

( * ) Notice: Subject to any disclaimer, the term of this patent is extended or adjusted under 35 U.S.C. 154(b) by 108 days.

(21) Appl. No.: 17/097,203

(22) Filed: Nov. 13, 2020

(65) Prior Publication Data

US 2022/0156357 A1    May 19, 2022

(51) Int. Cl.
*G06F 21/36* (2013.01)
*G06F 3/04886* (2022.01)
*G06F 21/45* (2013.01)

(52) U.S. Cl.
CPC .......... *G06F 21/36* (2013.01); *G06F 3/04886* (2013.01); *G06F 21/45* (2013.01)

(58) Field of Classification Search
CPC ...... G06F 21/36; G06F 3/04886; G06F 21/45; H04N 21/4318; H04N 21/4753
See application file for complete search history.

(56) References Cited

U.S. PATENT DOCUMENTS 9,015,620 B1 * 4/2015 Delker .................. G06F 3/0481
                                              715/810
9,582,139 B1 * 2/2017 Tseng ...................... G06F 3/147
(Continued)

FOREIGN PATENT DOCUMENTS

CN      107529083      12/2017
EP       3493039        6/2019

OTHER PUBLICATIONS

Android Developers, "Support Keyboard Navigation", last updated Sep. 17, 2020, pp. 1-2, available at: https://developer.android.com/training/keyboard-input/navigation#Direction.
(Continued)

*Primary Examiner* — Carl G Colin
*Assistant Examiner* — Hany S. Gadalla
(74) *Attorney, Agent, or Firm* — Brake Hughes Bellermann LLP

(57) ABSTRACT

Systems, methods, and media for obfuscated personal identification number entry on media devices are provided. In some implementations, a method for personal identification number entry on media devices includes: receiving, using a media device, a request to enter a personal identification number (PIN) using a remote control device that is connected to the media device; causing a PIN entry interface screen that includes (i) a PIN pad in which a plurality of numerical characters and one or more functional options are divided into a plurality of subsections and (ii) a virtual directional pad interface that corresponds to a directional pad having a plurality of directional buttons and a central select button on the remote control device, wherein the virtual directional pad interface allocates a first subset of the directional buttons and a central select button on the remote control device to an active subsection of the plurality of subsections and wherein the virtual directional pad interface allocates a second subset of the directional buttons on the remote control device to navigate between each of the plurality of subsections; receiving a key press from the remote control device; and updating a PIN entry region on the PIN entry interface screen with a numerical character or performing a functional option from the one or more functional options that corresponds with the received key press, wherein the numerical character that corresponds with the (Continued)

received key press and the received key press are inhibited from being presented on the PIN entry interface screen.

20 Claims, 19 Drawing Sheets

(56) References Cited

U.S. PATENT DOCUMENTS

| | | | |
|---|---|---|---|
| 10,437,349 B2* | 10/2019 | Jeong | H04N 21/42204 |
| 2004/0178923 A1* | 9/2004 | Kuang | G08C 17/00 |
| | | | 455/3.03 |
| 2009/0138907 A1 | 5/2009 | Wiser et al. | |
| 2013/0047238 A1* | 2/2013 | Hwang | H04L 9/3228 |
| | | | 726/7 |
| 2013/0254567 A1* | 9/2013 | Zhang | G08C 23/04 |
| | | | 713/310 |
| 2016/0092103 A1* | 3/2016 | Braden, V | G06F 3/04842 |
| | | | 715/773 |
| 2016/0275515 A1 | 9/2016 | Quigley et al. | |
| 2017/0228152 A1* | 8/2017 | Kim | G06F 3/04886 |
| 2019/0171356 A1* | 6/2019 | Kim | G06F 3/0234 |
| 2020/0065475 A1 | 2/2020 | Sharma | |

OTHER PUBLICATIONS

International Search Report and Written Opinion dated Feb. 9, 2022 in International Patent Application No. PCT/US2021/058937.

* cited by examiner

SYSTEMS, METHODS, AND MEDIA FOR OBFUSCATED PERSONAL IDENTIFICATION NUMBER ENTRY ON MEDIA DEVICES

TECHNICAL FIELD

The disclosed subject matter relates to systems, methods, and media for obfuscated personal identification number (PIN) entry on media devices.

BACKGROUND

Many devices provide the ability to authenticate a user account by inputting a PIN code into an authentication interface being displayed on a device. Entering a PIN code on a television device, however, is highly susceptible to being visible to others that are present in the same room due the television device's generally large screen size and the television device's location in a central position of the room. A leaked PIN code may, in some instances, lead to unauthorized content purchases, unauthorized application downloads, etc.

Current approaches for PIN entry on television devices using a remote control typically require special purposes keys on the remote control for entering PIN numbers. As such, these approaches for PIN entry cannot be used across different media devices and/or different remote controls.

Accordingly, it is desirable to provide new systems, methods, and media for obfuscated personal identification number entry on media devices.

SUMMARY

In accordance with various implementations of the disclosed subject matter, systems, methods, and media for personal identification number entry on media devices are provided.

In accordance with some implementations of the disclosed subject matter, a method for personal identification number entry on media devices, the method comprising: receiving, using a hardware processor of a media device, a request to enter a personal identification number (PIN) using a remote control device that is connected to the media device; causing, using the hardware processor, a PIN entry interface screen that includes (i) a PIN pad in which a plurality of numerical characters and one or more functional options are divided into a plurality of subsections and (ii) a virtual directional pad interface that corresponds to a directional pad having a plurality of directional buttons and a central select button on the remote control device, wherein the virtual directional pad interface allocates a first subset of the directional buttons and a central select button on the remote control device to an active subsection of the plurality of subsections and wherein the virtual directional pad interface allocates a second subset of the directional buttons on the remote control device to navigate between each of the plurality of subsections; receiving, using the hardware processor, a key press from the remote control device; and updating, using the hardware processor, a PIN entry region on the PIN entry interface screen with a numerical character or performing a functional option from the one or more functional options that corresponds with the received key press, wherein the numerical character that corresponds with the received key press and the received key press are inhibited from being presented on the PIN entry interface screen.

In some implementations, the PIN pad is presented adjacent to the virtual directional pad interface in the PIN entry interface screen and the active subsection of the plurality of subsections in the PIN pad is highlighted.

In some implementations, each subsection of the plurality of subsections corresponds to a sequence of numerical characters, where the first subset of the directional buttons on the remote control device comprises a left button and a right button of the directional pad of the remote control device, and where the left directional button, the central select button, and the right directional button are each allocated to a numerical character in the sequence of numerical characters.

In some implementations, the second subset of the directional buttons on the remote control device comprises an up button and a down button of the directional pad of the remote control device, where the up button and the down button are each allocated to a navigation to an adjacent subsection to the active subsection.

In some implementations, each subsection of the plurality of subsections in the PIN pad corresponds to a row of numerical characters in the PIN pad.

In some implementations, the virtual directional pad interface in the PIN entry interface screen is shaped to correspond with the directional pad on the remote control device.

In some implementations, one of the plurality of numerical characters in the active subsection is presented on a representative directional button in the virtual directional pad interface.

In some implementations, the virtual directional pad interface is integrated within the PIN pad, where the virtual directional pad interface is presented in place of the active subsection of the PIN pad.

In some implementations, each of the plurality of subsections in the PIN pad is presented in the PIN entry interface screen as one of a plurality of virtual directional pad interfaces, where a first virtual directional pad interface is activated from the plurality of virtual directional pad interfaces, and where the first virtual directional pad interface corresponds with the active subsection.

In some implementations, a back button of the remote control device is allocated to delete the numerical character that was last entered in the PIN entry region.

In some implementations, the method further comprises, in response to determining that a correct PIN has been entered into the PIN entry region, causing an action to be performed on the media device.

In some implementations, the key press from the remote control device is a press and hold gesture that has been provided to the remote control device.

In some implementations, in response to receiving a press and hold gesture on a directional button on the directional pad of the remote control device, the PIN pad navigates from the active subsection to an adjacent subsection.

In some implementations, the one or more functional options includes an option to switch from a first user account to a second user account for entering the PIN.

In some implementations, the one or more functional options includes an option to hide the PIN pad from being presented on the PIN entry interface screen.

In some implementations, the one or more functional options includes an option to replace the PIN entry interface screen with a different PIN entry interface screen in which the numerical character that corresponds with the received key press is presented.

In some implementations, the one or more functional options includes an option to reset the PIN associated with a user account.

In some implementations, the one or more functional options includes an option to access an interface screen containing a plurality of options, where the plurality of options includes a first option to switch between user accounts, a second option to hide the PIN pad from being presented on the PIN entry interfaces screen, and a third option to reset the PIN associated with the user account.

In accordance with some implementations of the disclosed subject matter, a media device is provided, the media device comprising a hardware processor that: receives a request to enter a personal identification number (PIN) using a remote control device that is connected to the media device; causes a PIN entry interface screen that includes (i) a PIN pad in which a plurality of numerical characters and one or more functional options are divided into a plurality of subsections and (ii) a virtual directional pad interface that corresponds to a directional pad having a plurality of directional buttons and a central select button on the remote control device, wherein the virtual directional pad interface allocates a first subset of the directional buttons and a central select button on the remote control device to an active subsection of the plurality of subsections and wherein the virtual directional pad interface allocates a second subset of the directional buttons on the remote control device to navigate between each of the plurality of subsections; receives a key press from the remote control device; and updates a PIN entry region on the PIN entry interface screen with a numerical character or performing a functional option from the one or more functional options that corresponds with the received key press, wherein the numerical character that corresponds with the received key press and the received key press are inhibited from being presented on the PIN entry interface screen.

In accordance with some implementations of the disclosed subject matter, a non-transitory computer-readable medium containing computer-executable instructions that, when executed by a processor, cause the processor to perform a method for personal identification number entry on media devices is provided, the method comprising: receiving, using a media device, a request to enter a personal identification number (PIN) using a remote control device that is connected to the media device; causing a PIN entry interface screen that includes (i) a PIN pad in which a plurality of numerical characters and one or more functional options are divided into a plurality of subsections and (ii) a virtual directional pad interface that corresponds to a directional pad having a plurality of directional buttons and a central select button on the remote control device, wherein the virtual directional pad interface allocates a first subset of the directional buttons and a central select button on the remote control device to an active subsection of the plurality of subsections and wherein the virtual directional pad interface allocates a second subset of the directional buttons on the remote control device to navigate between each of the plurality of subsections; receiving a key press from the remote control device; and updating a PIN entry region on the PIN entry interface screen with a numerical character or performing a functional option from the one or more functional options that corresponds with the received key press, wherein the numerical character that corresponds with the received key press and the received key press are inhibited from being presented on the PIN entry interface screen.

In accordance with some implementations of the disclosed subject matter, a system for personal identification number entry on media device is provided, the system comprising: means for receiving, using a media device, a request to enter a personal identification number (PIN) using a remote control device that is connected to the media device; means for causing a PIN entry interface screen that includes (i) a PIN pad in which a plurality of numerical characters and one or more functional options are divided into a plurality of subsections and (ii) a virtual directional pad interface that corresponds to a directional pad having a plurality of directional buttons and a central select button on the remote control device, wherein the virtual directional pad interface allocates a first subset of the directional buttons and a central select button on the remote control device to an active subsection of the plurality of subsections and wherein the virtual directional pad interface allocates a second subset of the directional buttons on the remote control device to navigate between each of the plurality of subsections; means for receiving a key press from the remote control device; and means for updating a PIN entry region on the PIN entry interface screen with a numerical character or performing a functional option from the one or more functional options that corresponds with the received key press, wherein the numerical character that corresponds with the received key press and the received key press are inhibited from being presented on the PIN entry interface screen.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
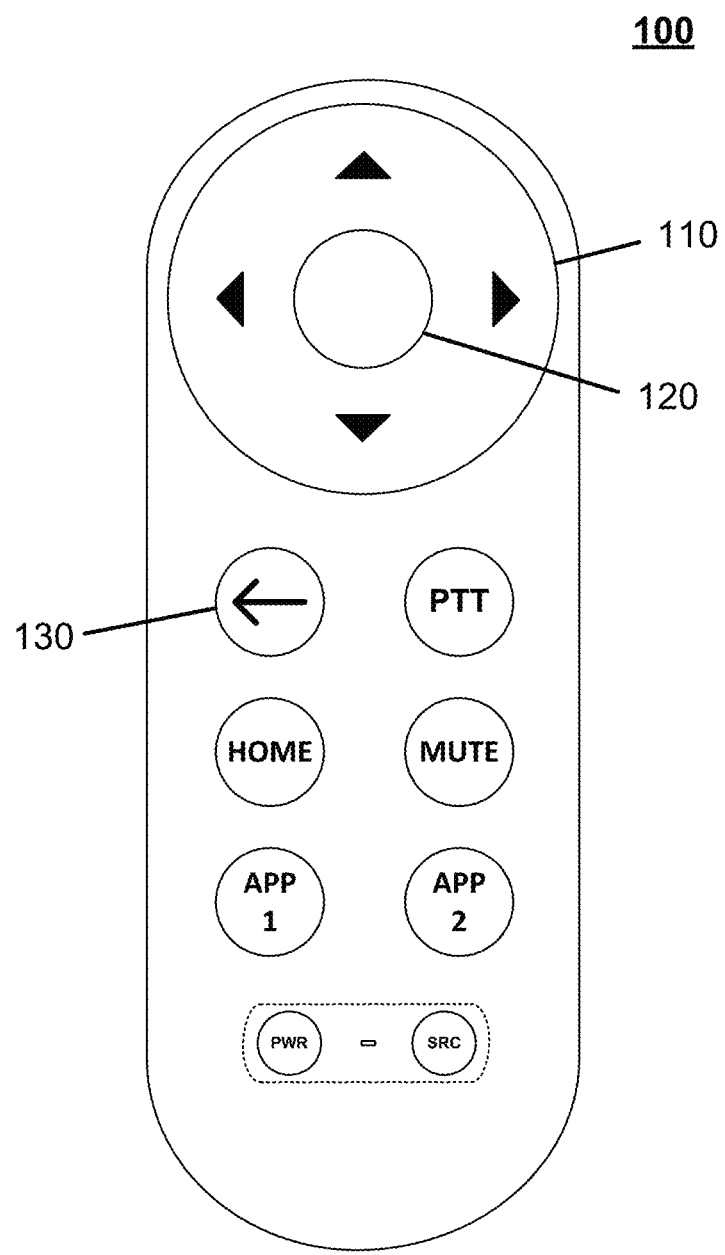
FIG. 1 shows an illustrative example of a top view of a remote control for providing one or more inputs to a media device incorporating the mechanisms described herein in accordance with some implementations of the disclosed subject matter.

In accordance with various implementations, mechanisms for obfuscated personal identification number entry on media devices are provided.

Prior approaches for entering PIN codes on a media device may be highly susceptible to being visible to others that are present in the same room due the screen size of the media device and/or due to the location of the media device (e.g., in a central position of a room).

The mechanisms described herein can provide an obfuscated PIN entry mode on a media device, thereby providing secure PIN entry.

In response to receiving a request to enter a personal identification number using a remote control device that is connected to the media device (e.g., in response to a request to authenticate a user account with a PIN number, in response to a request to access parental controls associated with a user account, in response to a request to add time to a timer associated with a child account, in response to a request to purchase a media content item, in response to a request to download an application on the media device), the mechanisms can generate and present a PIN entry interface screen for using the remote control to input one or more numerical characters.

In some implementations, the PIN entry interface screen can include a virtual directional pad interface (sometimes referred to herein as a "virtual d-pad"). For example, the virtual directional pad interface can include certain buttons from the remote control device that is connected to the media device, such as the directional pad having directional buttons and a selection button that may be located in a central portion of the directional pad. In a more particular example, the virtual directional pad interface can indicate how the buttons of the remote control have been re-mapped or otherwise allocated to input a numerical character or perform a functional option. In continuing this example, the virtual directional pad interface can indicate that, upon pressing a left directional button on the directional pad of the remote control in obfuscated PIN entry mode, the number "1" can be inputted into a PIN entry region. Alternatively, the virtual directional pad interface can indicate that, upon pressing an up directional button on the directional pad of the remote control in obfuscated PIN entry mode, a functional option can be initiated that allows the user to reset a PIN associated with the user account.

In some implementations, the PIN entry interface screen can include a PIN pad or number pad in which multiple numerical characters and one or more functional options are presented. It should be noted that the PIN pad can be subdivided in any suitable manner. For example, each row of the PIN pad can include a particular number of numerical characters (e.g., three characters, four characters, etc.). In continuing this example, the PIN pad in connection with the virtual directional pad interface can indicate which subsection or region of the PIN pad is active for selection using the remote control device. In a more particular example, the PIN pad can indicate that the remote control can be used to input numbers in the range of 0-3 and that, in response to pressing the down directional button on the remote control, the PIN pad can activate numbers in the adjacent range of 4-7 for selection using the remote control.

It should be noted that the PIN entry interface screen can present the virtual directional pad interface and the PIN pad in any suitable manner. For example, the virtual directional pad interface can be presented adjacent to the PIN pad. In another example, the virtual directional pad interface can be integrated into the PIN pad, where the active subsection or region of the PIN pad can be replaced with a shifting virtual directional pad interface. In yet another example, the PIN pad can be provided on a different screen from the virtual directional pad interface (e.g., where the user selects a number set from the PIN pad and a corresponding virtual directional pad interface can be presented to the user).

In response to receiving a key press from the remote control, the mechanisms can update the PIN entry region on the PIN entry interface screen with a numerical character that corresponds with the received key press and the active subsection of the PIN pad. It should be noted that the received key press and the inputted numerical character can be inhibited from being presented on the PIN entry interface screen.

In response to receiving a PIN using the PIN entry interface screen via remote control inputs, the mechanisms can determine whether a correct PIN has been provided and, in turn, whether to perform a corresponding action on the media device. For example, in response to determining that the inputted PIN matches the PIN associated with a user account, the mechanisms can authenticate the user account and can perform a corresponding action, such as adding time to a timer associated with a corresponding child account (e.g., add 30 minutes of watchtime to a child account).

These and other features for obfuscated personal identification number entry on media devices are described in connection with FIGS. 1-18B.

Turning to FIG. 1, an illustrative example of a top view of a remote control 100 is shown in accordance with some implementations of the disclosed subject matter. In some implementations, remote control 100 can include various buttons, such as buttons 110, 120, and 130. Note that, in some implementations, any of buttons 110, 120, and 130 can be omitted, and, in some such implementations, functions described herein as relating to buttons 110, 120, and 130 can be implemented using soft buttons that are dynamically generated on a display area (not shown) of remote control 100.

In some implementations, remote control 100 can include a directional pad 110 which can be pressed to indicate directional inputs. For example, depressing directional pad 110 at a particular point can complete (or inhibit) one or more circuits, and the completion of the one or more circuits can be detected by a processor of remote control 100 (e.g., as shown in and described below in connection with FIG. 2). The processor can then determine which direction was indicated based on which circuit(s) is completed. For example, if a right side of directional pad 110 is depressed, this can complete a circuit that indicates to the processor that the right side of the directional pad is pressed. In continuing this example, as described hereinbelow, if the right side of directional pad 110 is depressed when a PIN entry interface screen is being presented on a display, the numerical character or the functional option corresponding to the right directional input of directional pad 110 can be inputted to the media device (e.g., inputting the number "3" in a PIN entry region). In another example, in an instance in which a PIN entry interface screen is being presented on a display, an adjacent row or subsection of numerical characters can be navigated to in response to pressing and holding a left or right button from directional pad 110 for a particular period of time (e.g., three seconds).

It should be noted that directional pad 110 can be configured to accept any suitable number of inputs for various directions in accordance with some implementations. For example, the processor of remote control 100 can be configured to detect inputs in four directions (e.g., up, down, left and right) from directional pad 110. In another example, the processor of remote control 100 can be configured to detect eight directional inputs (e.g., up, down, left, right and intermediate directions, such as, top-right diagonal, top-left diagonal, bottom-right diagonal, and bottom-left diagonal) from directional pad 110. In yet another example, the processor of remote control 100 can be configured to detect inputs in any arbitrary direction from directional pad 110. In such an example, directional pad 110 can include touch sensors that can be used to detect an arbitrary position of an input to directional pad 110.

In some implementations, remote control 100 can include an "OK" or "select" button 120. For example, if select button 120 is depressed, this can complete a circuit that indicates to the processor that the select button is pressed. In another example, if select button 120 is depressed, this can complete a circuit that indicates to the processor to select an element currently highlighted on a display that is being navigated using remote control 100. In yet another example, as described hereinbelow, if select button 120 is depressed when a PIN entry interface screen is being presented on a display, the numerical character or the functional option corresponding to select button 120 can be inputted to the media device (e.g., inputting the number "5" in a PIN entry region). In a further example, in an instance in which a PIN entry interface screen is being presented on a display, a different row or subsection of numerical characters can be navigated to in response to pressing and holding select button 120 for a particular period of time (e.g., three seconds).

Note that, although FIG. 1 shows select button 120 as located in a center portion of directional pad 110, this is merely exemplary, and button 120 can be located at any suitable location on remote control 100.

In addition to directional buttons and a selection button, remote control 100 can include any suitable number of buttons that each perform one of a number of functions.

In some implementations, remote control 100 can include a back button 130. In some implementations, the selection of back button 130 can cause a previously presented user interface to be presented on a display of a media device controlled by remote control 100. For example, in an instance in which a user of remote control 100 uses remote control 100 to navigate from a first user interface to a second user interface, the selection of back button 130 can cause the display to present the first user interface. In another example, as described hereinbelow, in an instance in which a PIN entry interface screen is being presented on a display and in which one or more numerical characters have been inputted into a PIN entry region, the selection of back button 130 can cause the last inputted numerical character in the PIN entry region to be deleted. In yet another example, in an instance in which a PIN entry interface screen is being presented on a display and in which one or more numerical characters have been inputted into a PIN entry region, any numerical characters that have been inputted in the PIN entry region can be deleted in response to pressing and holding back button 130 for a particular period of time (e.g., three seconds).

In some implementations, remote control 100 can include a power button for controlling a power state of a media device, such as a television device, a streaming media device, a soundbar, and/or any other suitable media device. For example, if the power button is depressed, remote control 100 can cause a signal to be transmitted to the media device to power on (e.g., from an off or sleep state). Additionally, in some implementations, a selector (not shown) can be included that can be used to select a device from multiple devices to power on by pressing the power button. Such a selector can be, for example, a sliding switch, buttons that each correspond to various media devices, etc.

In some implementations, remote control 100 can include an indicator that indicates to a user which media device is currently selected.

In some implementations, remote control 100 can include an application button or any other suitable button that corresponds to an application executing on the media device. In some implementations, the application button can correspond to a particular application (e.g., an application associated with a particular media streaming service, and/or any other suitable application). In some such implementations, selection of the application button can cause the corresponding application to be launched by a media device controlled by remote control 100. In some implementations, selection of the application button at a time when a media device controlled by remote control 100 is powered off can cause the media device to be powered on prior to launching the application. Note that, remote control 100 can include any suitable number of application buttons (e.g., two, three, four, and/or any other suitable number) that each correspond to a different application.

In some implementations, remote control 100 can include a microphone button for initiating a microphone function on a media device controlled by remote control 100. After pressing the microphone button, a user can be prompted to speak a voice command for causing the media device to perform some function. Any suitable techniques can be used to prompt a user for a voice command, such as, a sound, an image, etc. Alternatively, a user may not be prompted to speak a voice command, but pressing the microphone button can cause an instruction to the media device to prepare to receive a voice command (e.g., by activating a microphone on the media device). In some implementations, the media device and/or remote control 100 can be configured to recognize any suitable voice commands. For example, commands that replicate actions caused by pressing buttons on remote control 100 can be recognized. As another example, a user can initiate a search using a voice command. As yet another example, a user can tune to a particular channel by number and/or by name (e.g., channel 451, channel 2, "CBA," "Food Channel," etc.). As a further example, a user can launch an application on the media device using a voice command (e.g., "play <video> using <application>").

In some implementations, a microphone for receiving voice commands can be included in remote control 100. If a microphone is included in remote control 100, a voice command can be interpreted by a processor of remote control 100 and/or can be sent to the media device controlled by remote control 100 for interpretation, to an intermediate device or streaming device associated with the system for interpretation (e.g., as shown in and described below in connection with FIG. 2), and/or to a server for interpretation (e.g., as shown in and described below in connection with FIG. 2). Additionally, in some implementations, the microphone can be used for detecting a trigger sound (e.g., clapping, a spoken word, and/or any other suitable trigger sound). In some implementations, in response to detecting the trigger sound, remote control 100 can be programmed to present an indication of a location of remote control 100, for example, by emitting a particular tone, beep, or other audible sound.

In some implementations, remote control 100 can include a home button for returning to a home screen of a media device controlled by remote control 100 and/or exiting from a current screen and returning to a main input. For example, if the media device that is being controlled using remote control 100 is a digital media receiver running an operating system that has a home screen, an instruction transmitted in response to pressing the home button can cause the digital media receiver to go to the home screen. As another example, if the media device that is being controlled using remote control 100 is a set-top box from a cable provider, an instruction transmitted in response to pressing the home button can cause the set-top box to exit any screen that is currently being displayed and return to a last channel that was tuned by the set-top box. In some implementations, if the media device is currently running an application, pressing the home button can cause the media device to display a home screen of the application. Additionally, in such an implementation, pressing and holding the home button can cause the media device to go to a home screen of the media device.

In some implementations, remote control 100 can include a mute button for muting the sound output from a media device controlled by remote control 100.

In some implementations, remote control 100 can include a volume button. The volume button can be used to control a volume of a media device controlled by remote control 100 and/or one or more speakers associated with the media device. For example, a volume rocker button can be provided on remote control 100 in which pressing a top portion of the volume rocker button can cause the volume of the media device to increase and in which pressing a bottom portion of the volume rocker button can cause the volume of the media device to decrease. In some implementations, the volume button can be located at any suitable location on remote control 100 (e.g., a side portion of remote control 100).

In some implementations, remote control 100 can also include a motion sensor (not shown) for sensing rotational and/or linear motion of remote control 100, and/or orientation of remote control 100. For example, when the user moves remote control 100 containing the motion sensor (e.g., a gyroscope, an accelerometer, a magnetometer, etc.), the motion sensor can transmit motion and/or orientation information relating to remote control 100. As described herein, the motion sensor can be used to detect signals indicative of motion of remote control 100, detect signals indicative of the orientation of remote control (e.g., which portion of remote control 100 is facing up), detect signals indicative of particular gestures (e.g., shaking, swinging, etc.), etc.

In some implementations, remote control 100 can include any other suitable selectable buttons not shown in FIG. 1. For example, in some implementations, remote control 100 can include an input button for controlling a selected input of a media device. For example, if the media device is a television, it can have multiple inputs such as one or more High Definition Multimedia Interface (HDMI) inputs, one or more coaxial inputs, one or more component video inputs, one or more DisplayPort inputs, one or more fiber optic inputs, etc. Pressing the input button can cause remote control 100 to transmit an instruction to a media device to change a selected input. Selecting an input can be performed using any suitable technique. For example, in some implementations, after pressing the input button, a list of selectable inputs can be displayed on a display connected to the media device and a user can select a desired input by either holding down and/or repeatedly pressing the input button, or by using directional pad 110 and selection button 120 to navigate to a particular input and select the particular input.

As another example, in some implementations, remote control 100 can include a picture-in-picture (PiP) button. For example, if a user depresses the PiP button, remote control 100 can transmit an instruction to a media device to display content from a second source (e.g., a second channel) over content from a first source currently being displayed (e.g., a first channel). In such an example, the content from the second source can be displayed, for instance, in a corner of a display connected to the media device.

As yet another example, in some implementations, remote control 100 can include a guide button that can initiate a program guide of available media content. For example, such a guide can be an electronic program guide that displays available programming to a user and can be organized based on time, channel, category, etc. As another example, such a guide can include a list of over-the-top content, such as television shows and/or movies, that are available to be retrieved and displayed by a media device controlled by remote control 100.

As still another example, in some implementations, remote control 100 can include a menu button for calling up a menu on a media device controlled by remote control 100. For example, pressing the menu button can cause the media device to open a menu. As another example, if the media device is running an application, pressing the menu button can cause additional options and/or a menu related to the application to be presented to the user.

As still another example, in some implementations, remote control 100 can include media buttons for controlling playback of media by a media device controlled by remote control 100. For example, the media buttons can include a play button, a pause button, a fast-forward button, a rewind button, a skip forward button, any other suitable media buttons, and/or any suitable combination thereof. In some implementations, buttons that a user may use more commonly (e.g., play and pause buttons) can be centrally located and raised as compared to less commonly used buttons (e.g., rewind and fast forward). Additionally or alternatively, different media buttons can have different shapes to differentiate the buttons from one another. These features can facilitate a user in pressing a correct button while the user's gaze is not directed at remote control 100, but is instead directed at, for example, a display connected to the media device.

Figure 2:
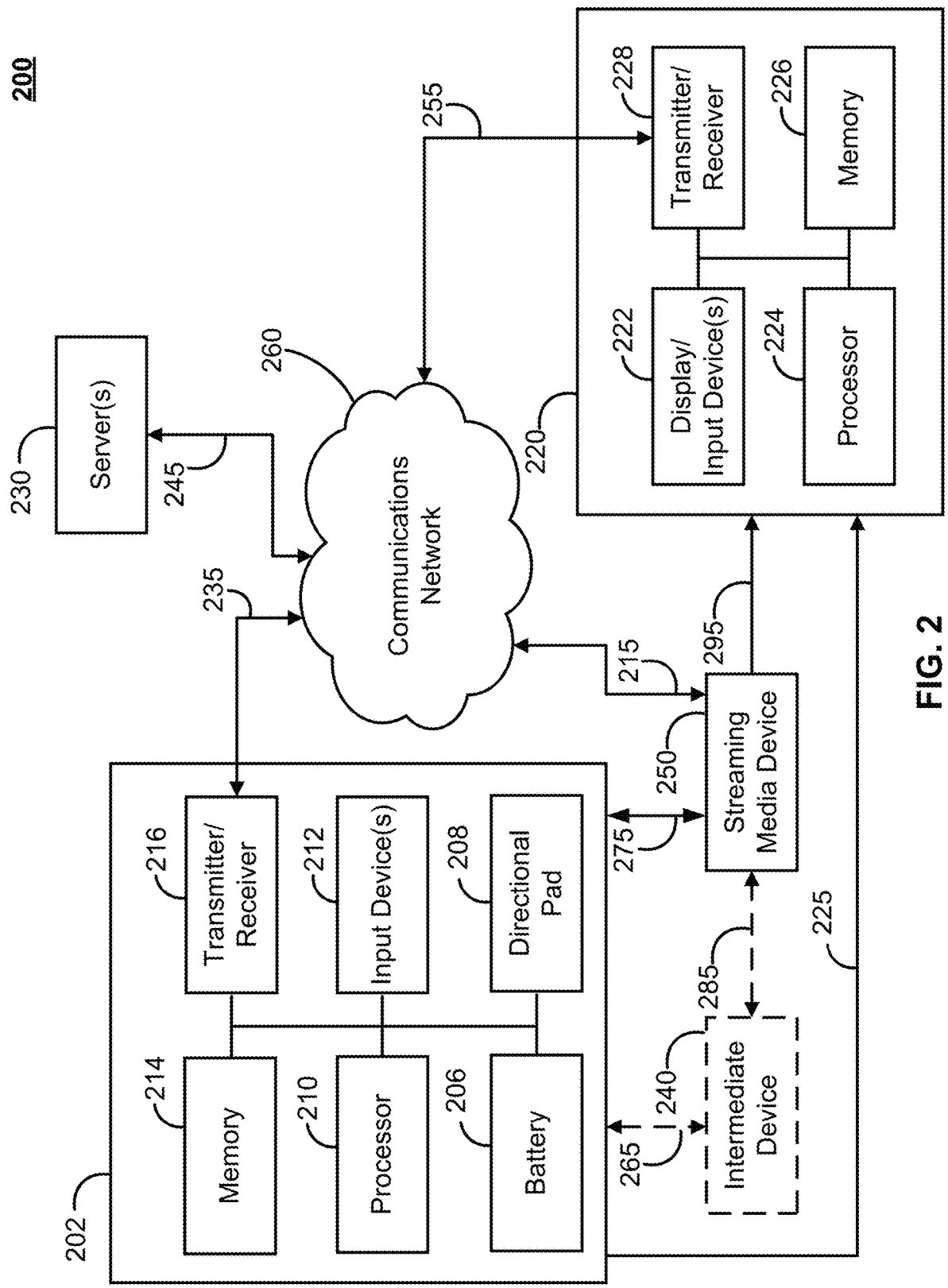
FIG. 2 shows an illustrative example of a schematic diagram of a system for providing obfuscated PIN entry on media devices in accordance with some implementations of the disclosed subject matter.

Turning to FIG. 2, an illustrative example of a generalized schematic diagram of a system 200 that includes a media device, a remote control that controls the media device, and a server is shown in accordance with some implementations of the disclosed subject matter.

As illustrated, system 200 can include a remote control 202 that can be used to control one or more media devices, such as a media device 220. In a more particular example, as shown in FIG. 2, remote control 202 can include a battery 206, a directional pad 208, a processor 210, one or more input devices 212, a memory 214, and a transmitter/receiver 216, which can be interconnected.

In some implementations, battery 206 can be any suitable type of battery for powering remote control 202. For example, in some implementations, battery 206 can be a rechargeable battery. In some such implementations, battery 206 can be charged using power from an external source which can be connected to remote control 202 in any suitable manner (e.g., a micro USB port on remote control 202, and/or in any other suitable manner). Additionally or alternatively, battery 206 can be wirelessly charged, where a wireless power transceiver of a charging device can receive power from a power source and, in turn, the wireless power transceiver of the charging device can transmit power to battery 206 of a connected remote control 202 via a suitable converter circuit.

In some implementations, remote control 202 can include directional pad 208. Directional pad 208 can include a number of switches that, when activated, indicate a directional input, as shown in and described above in connection with FIG. 1. For example, directional pad 208 can include a button that a user can press to indicate a direction. This button can activate one or more of the switches, and a signal from the one or more switches can be correlated by processor 210 with a direction indicated by pressing the button. In another example, as shown in FIG. 1, directional pad 208 can be configured around the periphery of a central select button.

Directional pad 208 and processor 210 can be configured to accept any suitable number of inputs for various directions in accordance with some implementations. For example, processor 210 can be configured to detect inputs in four directions (e.g., up, down, left and right) from directional pad 208. In another example, processor 210 can be configured to detect eight directional inputs (e.g., up, down, left, right and intermediate directions, such as, top-right diagonal, top-left diagonal, bottom-right diagonal, and bottom-left diagonal) from directional pad 208. In yet another example, processor 210 can be configured to detect inputs in any arbitrary direction from directional pad 208. In such an example, directional pad 208 can include touch sensors that can be used to detect an arbitrary position of an input to directional pad 208.

In some implementations, processor 210 can use a computer program to cause signals to be transmitted from remote control 202. In some implementations, these signals can be transmitted using transmitter/receiver 216, which can include one or more transmitters, receivers, antennas, transmitter/receivers, etc. Transmitter/receiver 216 can transmit and/or receive signals using any suitable technologies and/or frequencies. For example, transmitter/receiver 216 can transmit and/or receive Bluetooth signals (e.g., Bluetooth Low Energy (BLE) signals), Wi-Fi signals, radio signals, infrared signals, near-infrared signals, ultrasonic signals, etc. In a more particular example, transmitter/receiver 216 of remote control 202 can transmit a directional input, a selection button key press, or a back button key press in the form of BLE signals to a media streaming device that is connected to a display device via an HDMI port on the display device, where the media streaming device transmits the directional input, the selection button key press, or the back button key press over the HDMI-CEC channel between the media streaming device and the display device. In another example, transmitter/receiver 216 of remote control 202 can transmit and/or receive Wi-Fi signals over communications network 206 with transmitter/receiver 228 of media device 220. In yet another more particular example, transmitter/receiver 216 of remote control 202 can transmit and/or receive BLE signals between transmitter/receiver 228 of media device 220 and/or any other suitable intermediate device or streaming media device.

In some implementations, memory 214 can store a computer program for controlling processor 110. For example, the computer program can be stored in read-only memory (ROM), electrically programmable read only memory (EPROM), electrically erasable programmable read only memory (EEPROM), flash memory, etc.

In some implementations, it should be noted that remote control 202 can include any other suitable input devices 212. Input devices 212 can include other suitable input features, such as an alphanumeric keypad, a power button, an input button, channel buttons, volume buttons, a volume mute button, directional buttons, media playback buttons (e.g., rewind, pause, play, and fast-forward buttons), a dedicated button that accesses downloadable applications for use by the media device, a microphone or other suitable audio input, a camera, etc. For example, in some implementations, remote control 202 can include a microphone that can be used for any suitable purposes. As a more particular example, in some implementations, the microphone can be used to receive voice queries (e.g., to begin playing a particular media content item, to execute a search query, and/or any other suitable voice query), which can be processed either by remote control 202 or transmitted from remote control 202 to another device for processing (e.g., to media device 220, to server 230, and/or to any other suitable device). As another more particular example, in some implementations, the microphone can be used to detect any suitable audible sound (e.g., clapping, a spoken word or phrase, etc.) that can be used as a trigger to present an indication of a location of remote control 202 (e.g., by causing the remote control to emit an audible tone or beep). In some implementations, input devices 212 can include hardware buttons and/or software buttons (e.g., programmable buttons). In some implementations, input devices 212 can also include other inputs, such as, a computer keyboard, a cursor-controller, a dial, a switchbank, a lever, a touchscreen, and/or any other suitable input device.

System 200 can include one or more media devices 220, such as a media device for viewing media content listings and/or obtaining and presenting content items from various sources (e.g., broadcast content, on-demand content, locally stored content, Internet content, streamed content, live-streamed content, etc.). For example, media device 220 can be implemented as a television, a smart television, a set-top box, a streaming media device, a digital media receiver, a computer, a gaming console, an optical media player, etc. Remote control 202 and media device 220 can be local to each other or remote from each other. For example, enhanced remote control 202 and media device 220 can be located in the same room.

More particularly, in some implementations, media device 220 can include a display/input device 222, a processor 224, memory 226, and one or more transmitters, receivers, and/or transmitter/receivers 228, which can be interconnected.

In some implementations, media device 220 can include a storage device, such as a hard drive, a digital video recorder, a solid-state storage device, a removable storage device, or any other suitable device for storing guidance information and/or remote control instructions. In a more particular example, the storage device can store a computer program for controlling processor 224 in media device 220 (e.g., responsive to instructions received from remote control 202).

Processor 224 can use the computer program to present content on display/input device 222 and control an interface that allows a user to interact with the content and to send and receive data using transmitter/receiver 228. In some implementations, transmitter/receiver 228 can transmit and/or receive Bluetooth signals (e.g., BLE signals), Wi-Fi signals, radio signals, infrared signals, near-infrared signals, ultrasonic signals, etc. For example, transmitter/receiver 228 of media device 220 can transmit and/or receive Wi-Fi signals over communications network 206 with transmitter/receiver 216 of remote control 202. In another example, transmitter/receiver 228 of media device 220 can transmit and/or receive BLE signals between transmitter/receiver 216 of remote control 202 and/or any other suitable intermediate device or streaming media device.

Display/input device 222 can include input devices such as a computer keyboard, a cursor-controller, one or more buttons, a dial, a switchbank, a lever, a touchscreen, and/or any other suitable input device.

In some implementations, instructions issued by remote control 202 can be formatted based on a model and/or brand of a media device 220 that is being controlled. For example, remote control 202 can be programmed with different codes and can act as a universal remote control for controlling different types of media devices. In some implementations, formatting can be performed by a converter (not shown) that converts signals transmitted by remote control 202 into signals used by a particular media device 220.

In a more particular example, remote control 202 and media device 220 can be any of a general purpose device such as a computer or a special purpose device such as a remote control, a smartphone, a tablet computer, a set-top box, a smart TV, a game console, a digital media receiver, a server, etc., or any suitable combination of such devices. Any of these general or special purpose devices can include any suitable components such as a hardware processor (which can be a microprocessor, digital signal processor, a controller, etc.), memory, communication interfaces, display controllers, input devices, etc. For example, media device 220 can be implemented as a set-top box, a digital media receiver, a smart TV, a television, a laptop computer, a personal computer, a server, a smartphone, a tablet computer, a game console, etc.

In some implementations, server 230 can be any suitable server that provides media content (e.g., television shows, video content, movies, live-streamed video content, audio content, video game content, and/or any other suitable media content), receives and maintains user preference settings, and/or perform any other suitable function(s). For example, in some implementations, server 230 can determine whether to authenticate a user account based on an inputted PIN and can determine whether to perform a particular action based on the authenticated user account (e.g., add time to a timer, unlock parental controls, purchase a media content item, etc.).

In some implementations, remote control 202, media device 220, and server 230 can communicate in any suitable manner. For example, in some implementations, remote control 202 can transmit commands (e.g., commands to navigate within a user interface, volume commands, power commands, and/or any other suitable commands) to media device 220 using any suitable direct communication link 225 (e.g., an infrared communication link, a radio communication link, and/or any other suitable type of communication link).

As another example, in some implementations, server(s) 230 can receive and transmit information to remote control 202, media device 220, and/or a streaming media device 250 (described below in more detail) via a communication network 260. In some implementations, communication network 260 can be any suitable type of communication network, such as a Wi-Fi network, a Local Area Network (LAN), and/or any other suitable type of network. In some implementations, signals can be transmitted between remote control 202, media device 220, server(s) 230, and/or streaming media device 250 via communication network 260 using communication links 215, 235, 245, and/or 255, as shown in FIG. 2. In some implementations, communication links 215, 235, 245, and/or 255 can be any suitable type(s) of wired or wireless communication links.

In some implementations, communication between remote control device 202 and media device 220 can be via streaming media device 250 that is paired with media device 220 via a communication link 295. For example, in some implementations, streaming media device 250 can be connected to media device 220 via an HDMI connection. In some implementations, streaming media device 250 can launch any suitable applications used for presenting content on media device 220, for example, by launching an application and navigating to a particular deeplink associated with requested content.

In some implementations, remote control device 202 can communicate with streaming media device 250 in any suitable manner. For example, in some implementations, remote control device 202 can communicate with streaming media device 250 via a communication link 275. In some such implementations, communication link 275 can be a Wi-Fi link, a Bluetooth link, and/or any other suitable type of communication link. In a more particular example, remote control device 202 can transmit an instruction to streaming media device 250 via a Wi-Fi signal or via a Bluetooth signal, where streaming media device 250 can transmit a corresponding instruction to media device 220 connected to streaming media device 250 (e.g., via a HDMI-CEC channel). Note that, in some implementations, remote control device 202 and streaming media device 250 can be paired in any suitable manner, such as via a discovery protocol (Discovery and Launch (DIAL), and/or any other suitable discovery protocol) associated with a local network. Additionally, note that, in instances in which communication link 275 is a Wi-Fi link, remote control 202 can be Wi-Fi capable.

As another example, in some implementations, remote control device 202 can communicate with streaming media device 250 via an intermediate device 240. In some implementations, intermediate device 240 can be a Wi-Fi dongle that allows intermediate device 240 to communicate via a Wi-Fi communication link 285 with streaming media device 250. In some implementations, remote control device 202 can communicate with intermediate device 240 via a communication link 265. In some implementations, communication link 265 can be a BLUETOOTH link, and/or any other suitable type of communication link. Note that, in some implementations, intermediate device 240 can be omitted.

Figure 3:
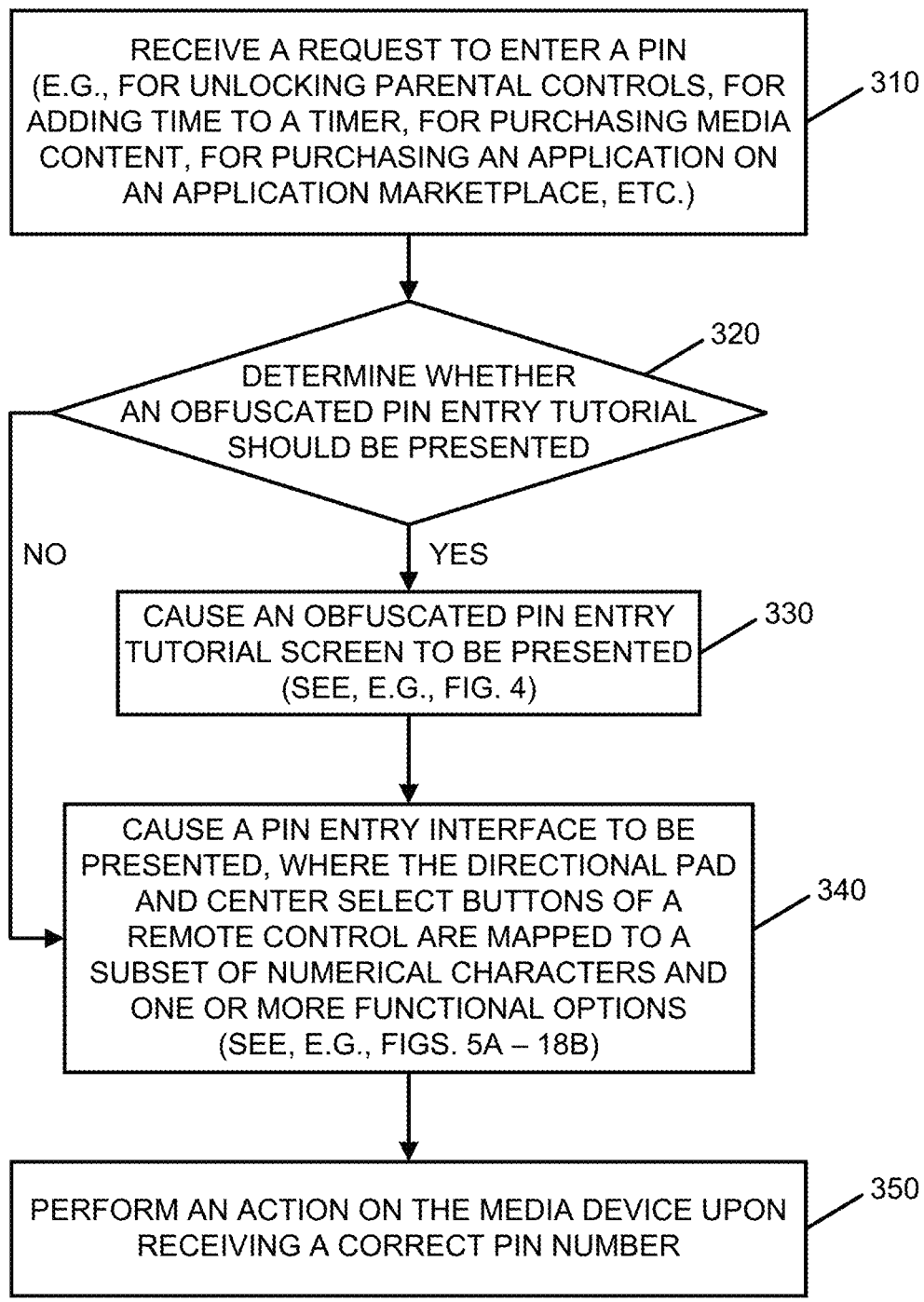
FIG. 3 shows an illustrative example of a process for providing obfuscated PIN entry on media devices in accordance with some implementations of the disclosed subject matter.

Turning to FIG. 3, an illustrative example 300 of a process for obfuscated personal identification number entry on media devices is shown in accordance with some implementations of the disclosed subject matter. In some implementations, blocks of process 300 can be executed by any suitable device, such as a media device (e.g., a television, a streaming media device paired with a television, a speaker, and/or any other suitable type of media device).

Process 300 can begin at 310 by receiving a request to enter a PIN on a media device. It should be noted that such a request can be received in any suitable manner. For example, a media application executing on the media device can determine that a PIN associated with a user account is needed to authenticate the user account, to unlock parental controls (e.g., for modifying one or more parental controls), to control settings associated with a child account, to add time to a timer (e.g., for adding time to a total available watchtime of a child account), to access and/or purchase a media content item, to download an application for installation on the media device, to execute an application on the media device, to play a game having a particular rating on the media device, etc.

It should be noted that, in some implementations, process 300 can receive a request to enter a PIN code or any other suitable password and can determine whether an obfuscated PIN entry mode can be suitable for entering a PIN on the media device. For example, in some implementations, process 300 can determine, based on device data and/or location data, that the media device is located within a household in which an inputted PIN code or password would be visible by others at or around the same location. In a more particular example, process 300 can determine, from device data indicating that the media device is a television device and from location data indicating that the television device is located in a living room of a household, that obfuscated PIN entry mode is a suitable mode for inputting a PIN responsive to the request.

In some implementations, in response to receiving the request to enter a PIN on the media device and/or in response to determining that the obfuscated PIN entry mode is suitable for entering a PIN on the media device, process 300 can initiate the obfuscated PIN entry mode by determining whether a user of the user account has previously entered a PIN on the media device using the obfuscated PIN entry mode at 320. For example, in some implementations, process 300 can determine whether this is the first time in which the user of the signed user account is using the obfuscated PIN entry mode. In another example, in some implementations, process 300 can determine whether user preferences associated with the user account indicate that a tutorial on using obfuscated PIN entry mode should be presented prior to entering a PIN on the media device (e.g., always present the tutorial screen, present the tutorial screen only if it is the first time that the user is using obfuscated PIN entry mode, etc.).

In some implementations, in response to determining that the user of the user account has not previously entered a PIN on the media device using the obfuscated PIN entry mode ("YES" at 320), process 300 can cause an obfuscated PIN entry tutorial screen to be presented on the media device. An illustrative example of a user interface that provides a tutorial for obfuscated PIN entry on a media device in accordance with some implementations of the disclosed subject matter is shown in FIG. 4.

Figure 4:
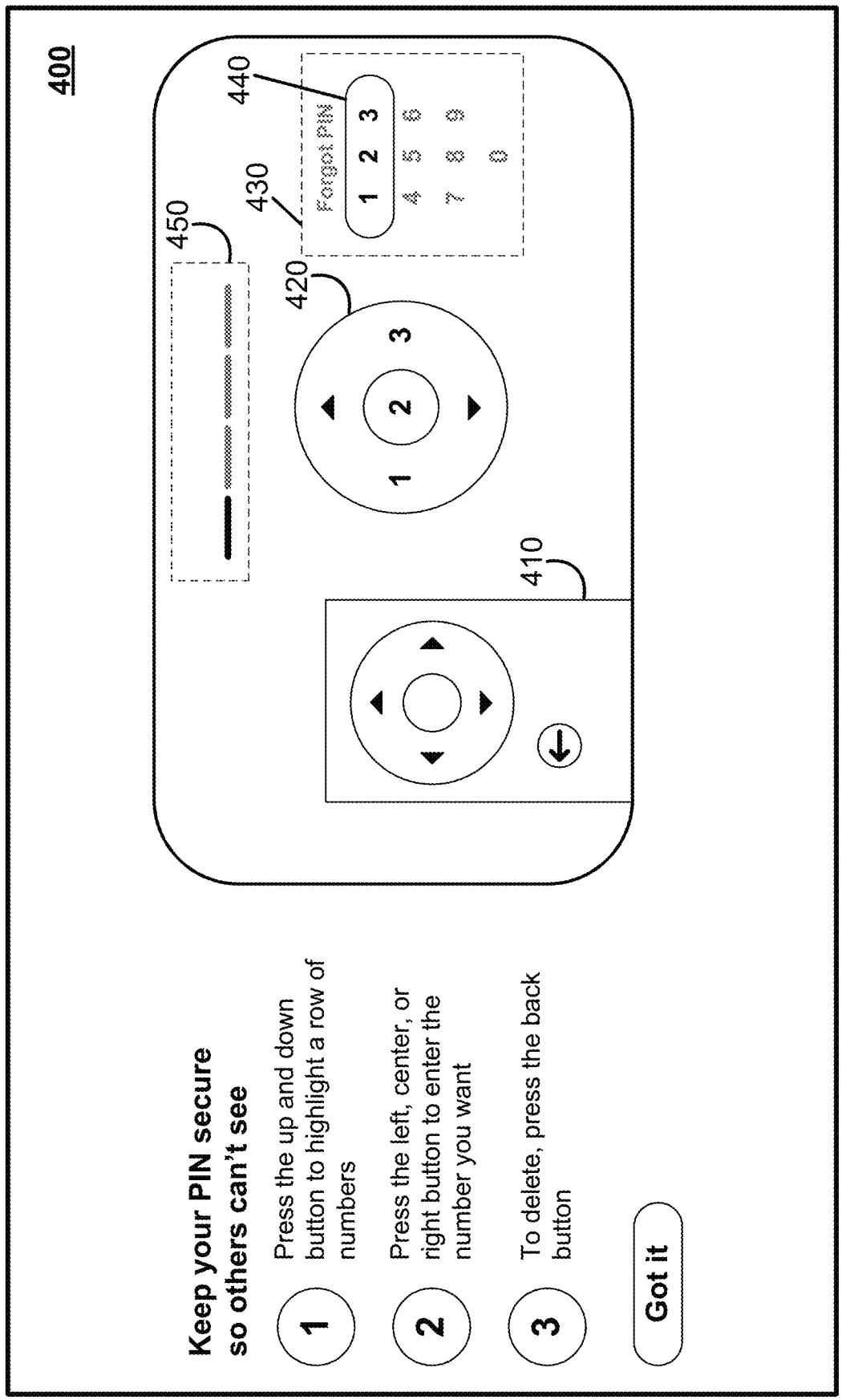
FIG. 4 shows an illustrative example of a user interface that provides a tutorial for obfuscated PIN entry on a media device in accordance with some implementations of the disclosed subject matter.

Turning to FIG. 4, in some implementations, the tutorial for obfuscated PIN entry can including presenting the user with a user interface that provides instructions for entering a PIN via a remote control in which buttons on the remote control have been allocated to particular numerical characters and/or functional options. In a more particular example, as shown in FIG. 4, such a user interface can include an image indicating how the buttons on the remote control have been re-mapped or otherwise allocated to particular numerical characters and/or functional options by showing an image of the remote control 410 and an adjacent image of a virtual directional pad 420 in the form of the directional pad and selection button of remote control 410. In continuing this example, as shown in FIG. 4, the user interface can instruct the user that pressing the up and down directional buttons on the remote control allow the user to navigate between rows of numerical characters or functional options (e.g., between number sets in the range of 1-3, 4-6, and 7-9 and 0 and a "Forgot PIN" operation). A PIN pad 430 can, in some implementations, be presented that indicates which row or subsection of multiple subsections in the PIN pad is active for user selection. For example, as shown in FIG. 4, the active subsection of the PIN pad can be indicated by highlighting the row with a highlight region 440. Additionally or alternatively, as also shown in FIG. 4, the active subsection of the PIN pad can be indicated by highlighting active characters (e.g., numerical characters "1," "2," and "3" are highlighted in PIN pad 430 in comparison with the remaining numerical characters and functional options that are inactive).

In some implementations, the tutorial for obfuscated PIN entry can provide a user with instructions on how to select a numerical character for a PIN and how to select a functional option. For example, as shown in FIG. 4, the user interface can instruct the user that pressing the left button, the center select button, or the right button of the remote control causes a corresponding numerical character from the active row that has been allocated to the particular button to be inputted. In a more particular example, as shown in FIG. 4, in the active row containing the numerical characters in the range of 1-3, a left button on the remote control can be allocated to the numerical character "1," a center select button of the remote control can be allocated to the numerical character "2," and a right button on the remote control can be allocated to the numerical character "3." In response to pressing the left button, the center select button, or the right button of the remote control, a corresponding numerical character can be input into a PIN entry region 450 (which can be represented with a symbol, such as * or ●, to indicate that a character has been entered).

In some implementations, the tutorial for obfuscated PIN entry can provide a user with instructions on how to delete an entered numerical character in PIN entry region 450. For example, as shown in FIG. 4, the user interface can instruct the user to press the back button on the remote control to delete the last inputted numerical character in PIN entry region 450. In another example, the user interface can instruct the user to press and hold the back button on the remote control for a particular period of time to delete all of the inputted numerical characters in PIN entry region 450.

Referring back to FIG. 3, in response to determining that the user has indicated an acknowledgement of the tutorial for obfuscated PIN entry (e.g., by pressing the center select button on the "Got it" interface element in the tutorial screen), process 300 can determine that the obfuscated PIN entry tutorial no longer needs to be presented to the user of the user account (at block 320 of FIG. 3). In some implementations, process 300 can increment a counter value associated with the user account that indicates the number of times that the obfuscated PIN entry tutorial has been presented to the user. In continuing this example, in response to the counter value being greater than a particular threshold value, process 300 can determine that the obfuscated PIN entry tutorial should not be presented to the user (e.g., "NO" at block 320).

In response to determining that the obfuscated PIN entry tutorial should not be presented to the user at block 320 or in response to presenting the obfuscated PIN entry tutorial to the user at block 330, process 300 can cause a PIN entry interface to be presented at 340. As described above in connection with the obfuscated PIN entry tutorial of FIG. 3, the directional pad buttons, the center select button, and the back button of the remote control can be allocated to particular numerical characters and/or one or more functional options. Illustrative examples of PIN entry interfaces for obfuscated PIN entry on a media device in accordance with some implementations of the disclosed subject matter are shown in FIGS. 5A-18B.

Figure 5A:
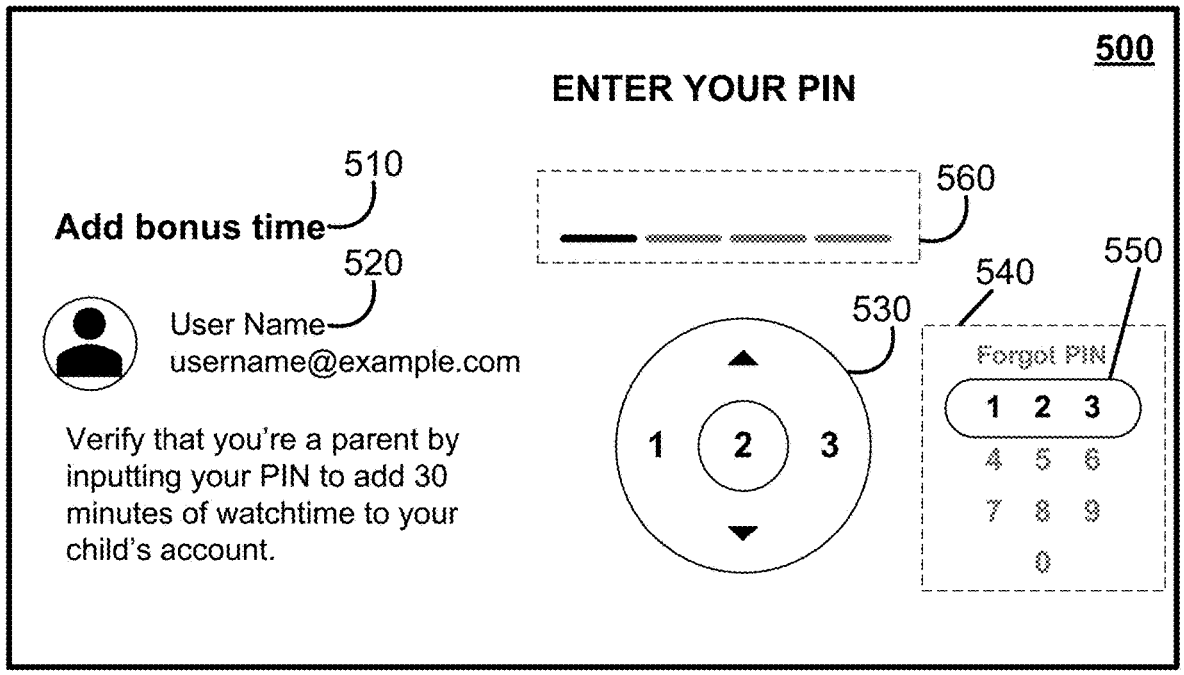
FIGS. 5A-5H show an illustrative example of a PIN entry interface screen that includes a PIN entry region, a virtual directional pad interface, and a PIN pad interface in which a remote control is used to provide a PIN for adding additional time to a timer associated with a user account in accordance with some implementations of the disclosed subject matter.

Turning to FIG. 5A, an illustrative example of a PIN entry interface 500 is shown in accordance with some implementations of the disclosed subject matter. As illustrated, in some implementations, PIN entry interface 500 can include an action descriptor 510, a user account representation 520, a virtual directional pad interface 530, a PIN pad 540, an active highlight region 550, and a PIN entry region 560.

Action descriptor 510 can be any suitable representation that indicates an action that is to be performed on the media device upon receiving a correct PIN. For example, as shown in FIG. 5A, action descriptor indicates that the obfuscated PIN entry mode has been initiated to add bonus time to a timer. In a more particular example, the obfuscated PIN entry mode can be used to verify that a parent account corresponding to user account representation 520 desires to add a particular amount of time (e.g., thirty minutes) to a watchtime associated with a corresponding child account.

It should be noted that, although action descriptor 510 in FIG. 5A indicates that the user desires to add time to a watchtime associated with a child account, this is merely illustrative and the obfuscated PIN entry mode can be used in any suitable application. For example, a media application executing on the media device can determine that a PIN associated with a user account is needed to authenticate the user account that is represented by user account representation 520, to unlock parental controls (e.g., for modifying one or more parental controls), to access and/or purchase a media content item, to download an application for installation on the media device, to execute an application on the media device, to play a game having a particular rating on the media device, etc.

Virtual directional pad interface 530 can be any suitable representation of the directional pad buttons and the center select button of a remote control being used to control the media device. For example, as shown in FIG. 5A, each virtual button on virtual directional pad interface 530 can be mapped to a button on the remote control being used to provide inputs to the media device (e.g., a left directional input, a right directional input, an up directional input, a down directional input, a center select input, a back input, etc.). In a more particular example, as shown in FIG. 5A, virtual directional pad interface 530 can be shaped to correspond with the directional pad buttons and the center select button of the remote control being used to control the media device. In another more particular example, virtual directional pad interface 530 can generally identify how the directional pad buttons and a select button of the remote control are allocated to numerical characters and/or functional options in PIN entry interface 500.

PIN pad 540 can be any suitable representation of the numerical characters and/or functional options that can be selected using PIN entry interface 500. For example, as shown in FIG. 5A, PIN pad 540 can be positioned adjacent to virtual directional pad interface 530, where a set of numerical characters from 0-9 and a "Forgot PIN" operation can be divided into rows of PIN pad 540. More particularly, in FIG. 5A, PIN pad 540 can be divided into rows or subsections that represent (1) numbers in the range of 1-3, (2) numbers in the range of 4-6, (3) numbers in the range of 7-9 and the number 0, and (4) a "Forgot PIN" option. As also shown in FIG. 5A, PIN pad 540 can also include active highlight region 550 that indicates which row or rows of PIN pad 540 are active for selection using the buttons of the remote control. For example, in FIG. 5A, the row corresponding to numbers in the range of 1-3 are highlighted. In continuing this example, as also shown in FIG. 5A, PIN pad 540 can indicate that the remaining rows are inactive for selection using the buttons of the remote control.

In some implementations, the numerical characters and/or functional options in the active row of PIN pad 540 can be indicated on virtual directional pad interface 530. For example, as shown in FIG. 5A, the number "1" has been positioned over the left directional button of virtual directional pad interface 530, the number "2" has been positioned over the center select button of virtual directional pad interface 530, and the number "3" has been positioned over the right directional button of virtual directional pad interface 530.

It should be noted that, although the implementations described herein generally relate to inputting numerical characters of a PIN, this is merely illustrative and the virtual directional pad interface can be configured to input any suitable character, such as one or more alphanumeric characters (e.g., letter A-Z), one or more symbols (e.g., !, @, #, etc.), one or more Spanish language characters with diacritical marks, etc.

Figure 5B:
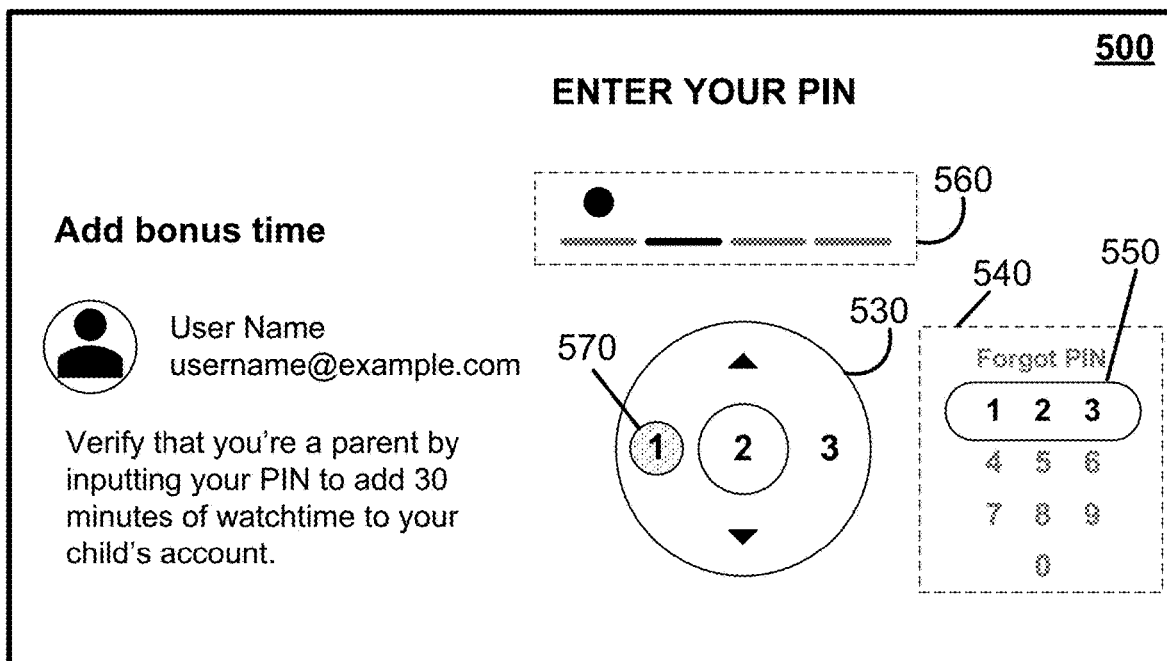

Turning to FIG. 5B, in response to selecting the left directional button of the remote control (as indicated by a marker 570 on virtual directional pad 530 in FIG. 5B), the corresponding number "1" from the active row of PIN pad 540 can be inputted into PIN entry region 560. In continuing this example, in response to selecting the center select button of the remote control (as indicated by marker 570 on virtual directional pad 530 in FIG. 5C), the corresponding number "2" from the active row of PIN pad 540 can be inputted into PIN entry region 560.

Figure 5C:
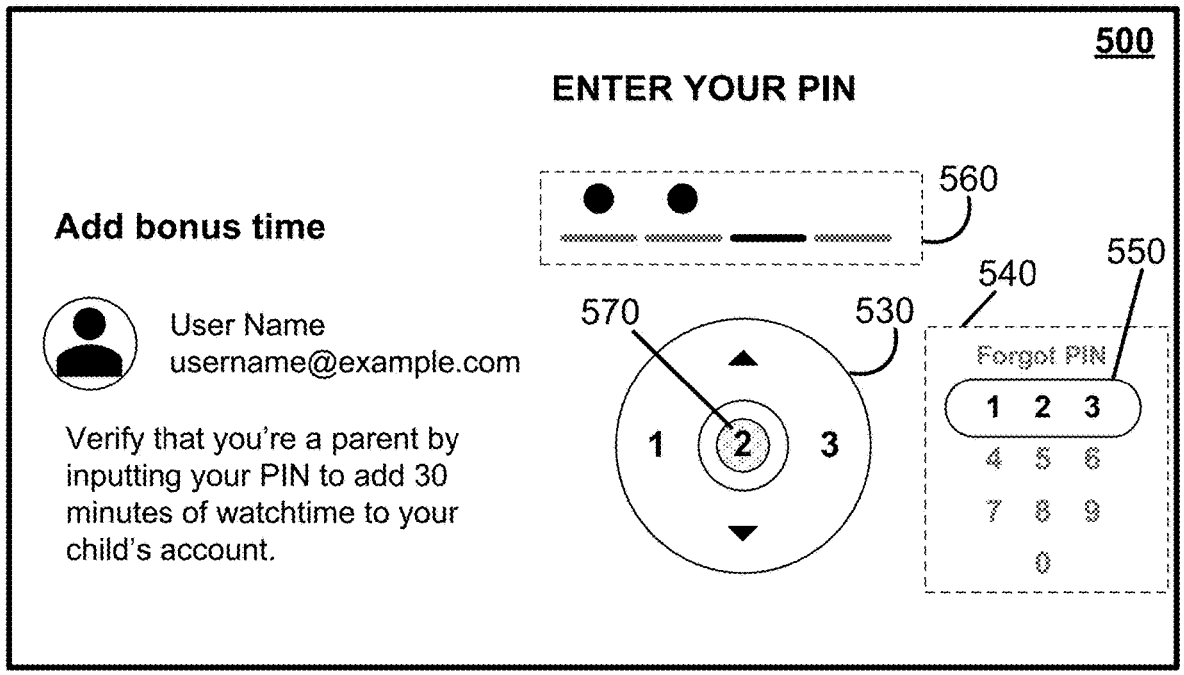

It should be noted that, as shown in FIGS. 5B and 5C and additional figures, while a corresponding numerical character "1" can be inputted as the first digit of the PIN and a corresponding numerical character "2" can be inputted as the second digit of the PIN, the inputted numerical characters can be represented with a symbol, such as * or ●, to indicate that a character has been inputted via a corresponding key press on the remote control. It should also be noted that, as shown in FIGS. 5B and 5C and additional figures, that PIN entry region 560 can, in some implementations, highlight the position in the PIN for which a numerical character is to be entered (e.g., the darkened blank line below a digit in the inputted PIN in PIN entry region 560). It should further be noted that, although marking 570 in FIGS. 5B and 5C and additional figures indicate that the left directional button of the remote control was pressed in FIG. 5B to input the number "1" in PIN entry region 560 and that the center selection button of the remote control was pressed in FIG. 5C to input the number "2" in PIN entry region, marking 570 and other markings described herein are generally not displayed in PIN entry interface 500 such that other users in the same room as the media device cannot determine which buttons on the remote control are being pressed when inputting the PIN.

Figure 5D:
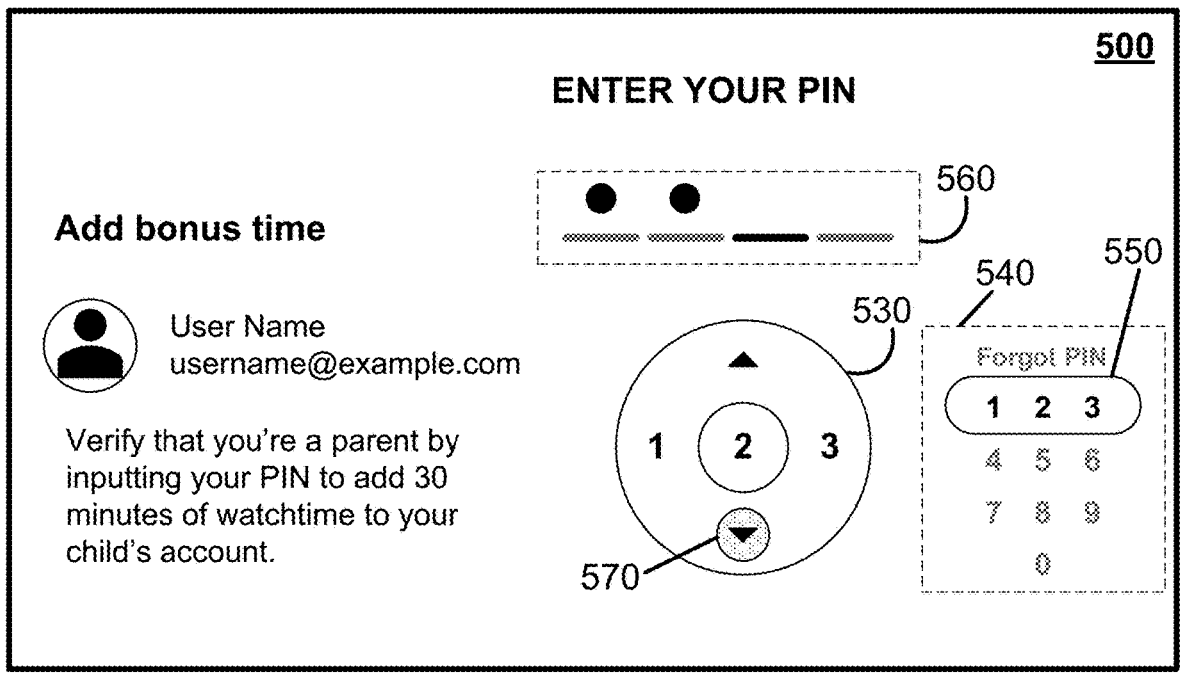
Figure 5E:
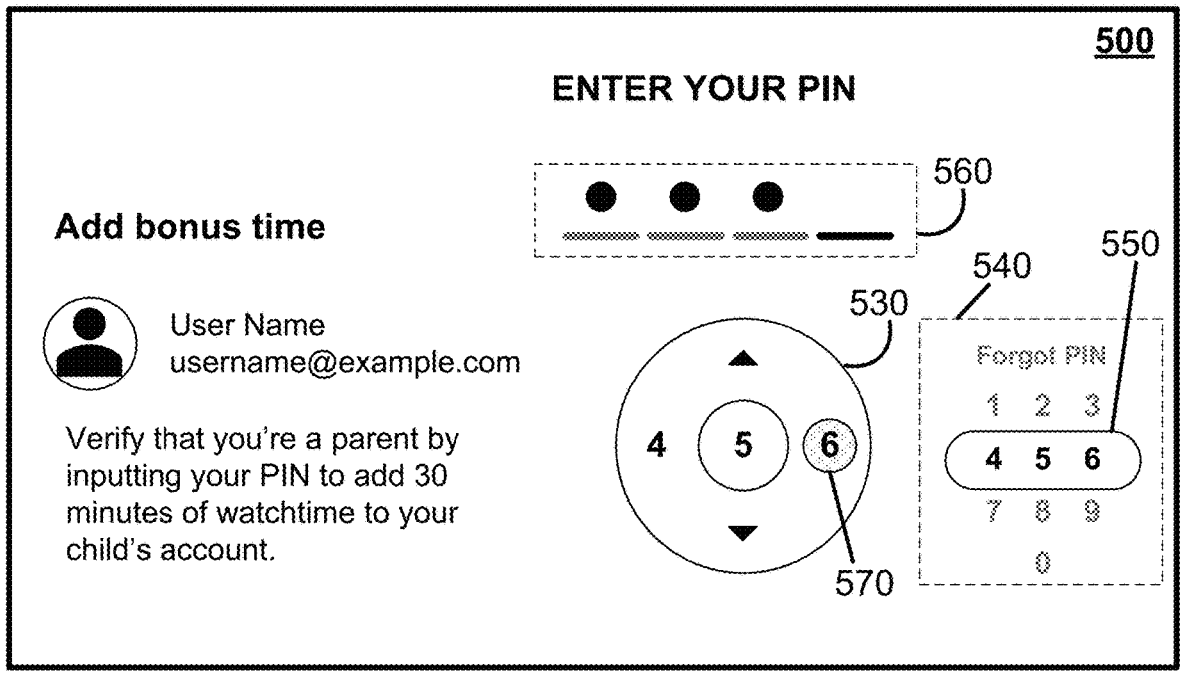

In continuing the example in FIG. 5C, in response to selecting the down directional button of the remote control (as indicated by marker 570 on virtual directional pad 530 in FIG. 5D), the active row of PIN pad 540 can be changed from a row corresponding to numbers in the range of 1-3 to an adjacent row corresponding to numbers in the range of 4-6. In turn, as shown in FIG. 5E, the number "4" has been positioned over the left directional button of virtual directional pad interface 530, the number "5" has been positioned over the center select button of virtual directional pad interface 530, and the number "6" has been positioned over the right directional button of virtual directional pad interface 530 and highlight region 550 has been positioned over the newly active row of PIN pad 540 including numbers in the range of 4-6. In response to selecting the right directional button of the remote control (as indicated by marker 570 on virtual directional pad 530 in FIG. 5E), the corresponding number "6" from the active row of PIN pad 540 can be inputted into PIN entry region 560.

Figure 5F:
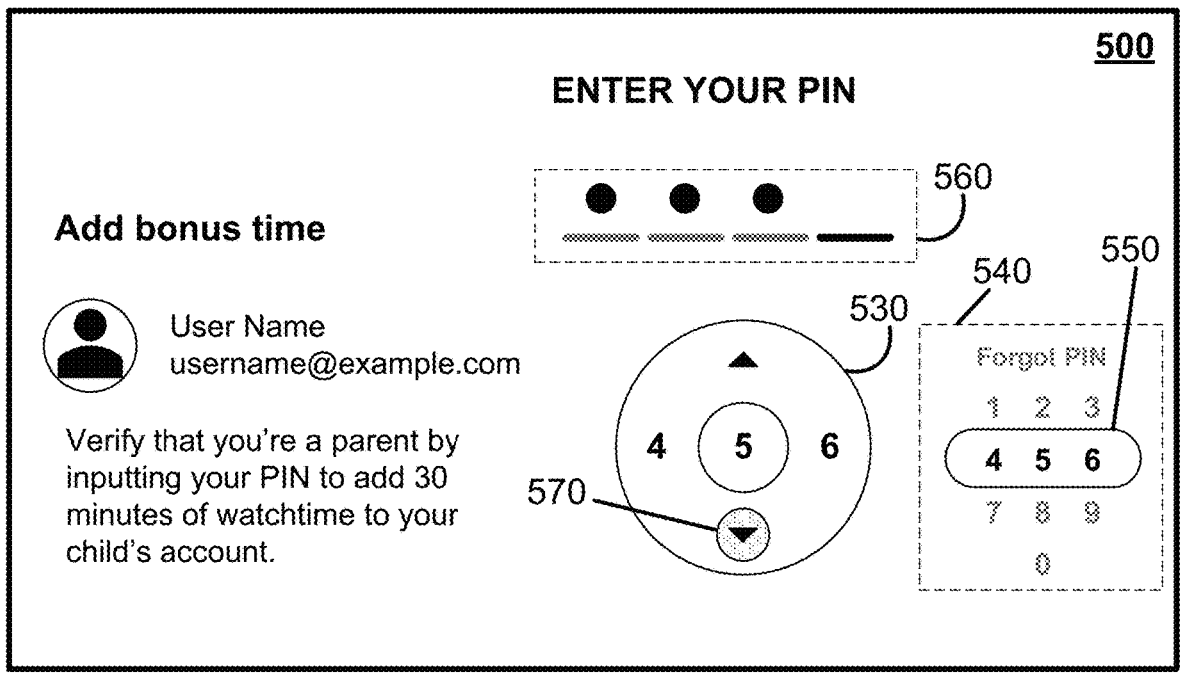
Figure 5G:
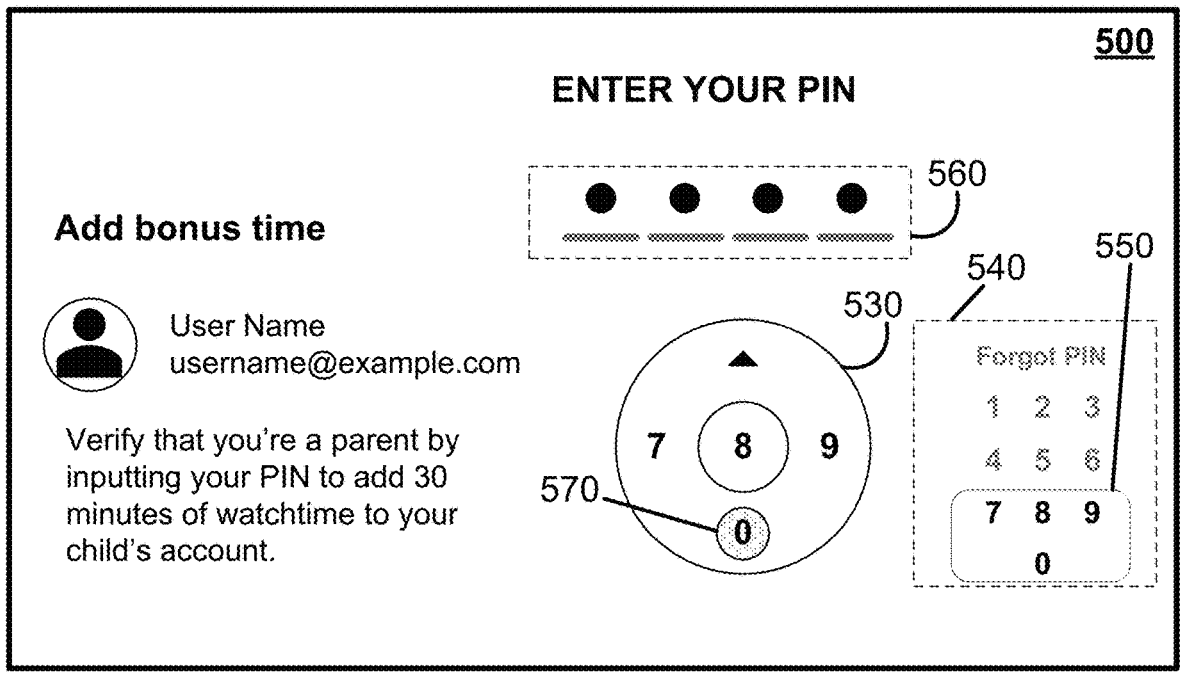

In continuing the example in FIG. 5E, in response to selecting the down directional button of the remote control (as indicated by marker 570 on virtual directional pad 530 in FIG. 5F), the active row of PIN pad 540 can be changed from a row corresponding to numbers in the range of 4-6 to an adjacent subsection corresponding to numbers in the range of 7-9 and the number 0. In turn, as shown in FIG. 5G, the number "7" has been positioned over the left directional button of virtual directional pad interface 530, the number "8" has been positioned over the center select button of virtual directional pad interface 530, the number "9" has been positioned over the right directional button of virtual directional pad interface 530, and the number "0" has been positioned over the down directional button of virtual directional pad interface 530. In addition, as shown in FIG. 5G, highlight region 550 has been positioned over the newly active subsection of PIN pad 540 including numbers in the range of 7-9 and the number 0. In response to selecting the down directional button of the remote control (as indicated by marker 570 on virtual directional pad 530 in FIG. 5G), the corresponding number "0" from the active row of PIN pad 540 can be inputted into PIN entry region 560.

Figure 6:
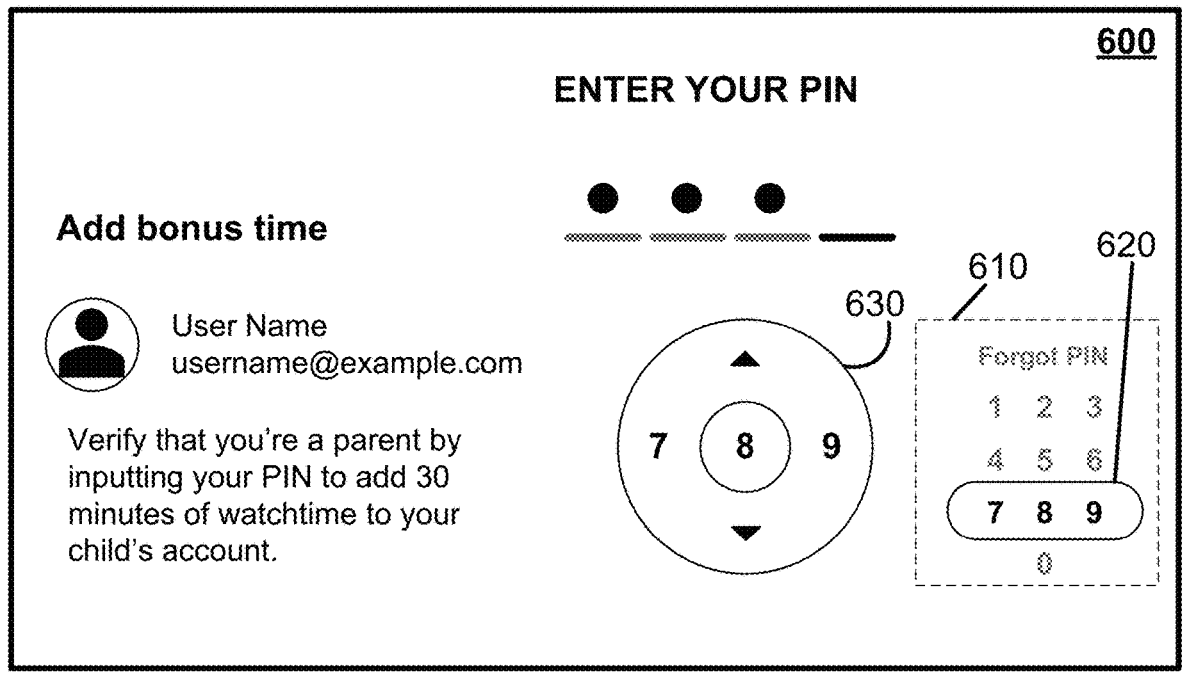
FIG. 6 shows an illustrative example of a PIN entry interface screen that includes an alternative PIN pad interface in accordance with some implementations of the disclosed subject matter.

It should be noted that, in some implementations, the numerical characters and/or functional options in PIN pad 540 can be divided into any suitable number of subsections. For example, in response to selecting the down directional button of the remote control (as indicated by marker 570 on virtual directional pad 530 in FIG. 5F), the active row of PIN pad 540 can be changed from a row corresponding to numbers in the range of 4-6 to an adjacent subsection corresponding to numbers in the range of 7-9 (as opposed to a subsection corresponding to numbers in the range of 7-9 and the number 0 as illustrated in FIG. 5F). In turn, as shown in FIG. 6, the number "7" has been positioned over the left directional button of virtual directional pad interface 530, the number "8" has been positioned over the center select button of virtual directional pad interface 530, and the number "9" has been positioned over the right directional button of virtual directional pad interface 530. In continuing to select the down directional button of the remote control, the active row of PIN pad 540 can be changed from a row corresponding to numbers in the range of 7-9 to an adjacent row corresponding to the number 0 in which the number "0" can be positioned over the central select button of virtual directional pad interface 530.

Referring back to FIG. 3, in response to receiving a PIN in PIN entry region 560 of PIN entry interface 500, process 300 can determine whether a correct PIN has been provided and, in turn, whether to perform an action on the media device. For example, as shown in FIGS. 5A-5G, the user has used the remote control in connection with PIN entry interface 500 to input a PIN of "1260." In continuing this example, process 300 can determine whether the PIN of "1260" matches the correct PIN associated with the user account represented by user account representation 520 and, in response to determining that the correct PIN has been entered, process 300 can authenticate the user account and can cause additional time to be added to a timer associated with a corresponding child account (e.g., add 30 minutes of watchtime to a child account).

Figure 5H:
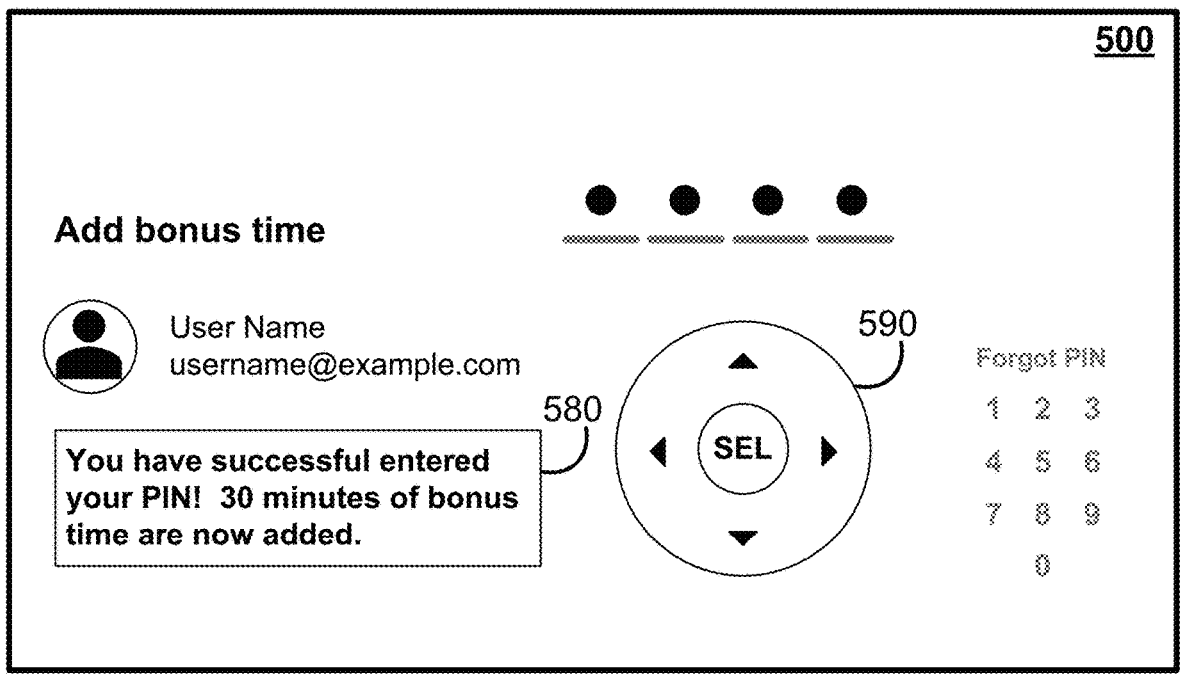

As shown in FIG. 5H, in response to determining that a correct PIN has been provided in PIN entry interface 500 at 350, PIN entry interface 500 can be updated with a notification 580 and an updated virtual directional pad interface 590. Notification 580 can be any suitable notification indicating that a correct PIN has been entered and that the corresponding action is to be performed by the media device (e.g., adding thirty minutes of bonus time). Updated virtual directional pad interface 590 can, for example, indicate that the remote control being used to control the media device has exited from the obfuscated PIN entry mode. As shown in FIG. 5H, the directional arrows are returned to updated virtual directional pad interface 590 and numerical characters and/or functional options are no longer transposed over buttons of updated virtual directional pad interface 590.

It should be noted that, although FIGS. 5A-5H illustrate a PIN entry interface that includes a virtual directional pad interface 530 and an adjacent PIN pad 540, this is merely illustrative and the virtual directional pad interface and the numerical characters and/or functional options for selection can be presented in any suitable matter.

In some implementations, alternatively to providing a PIN entry interface that includes a virtual directional pad interface 530 and an adjacent PIN pad 540, multiple virtual directional pad interfaces can be provided in a PIN entry interface. This can, for example, present each number set in a single interface (e.g., the numbers 0-2, 3-5, and 6-9 in three virtual directional pad interfaces).

Figure 7:
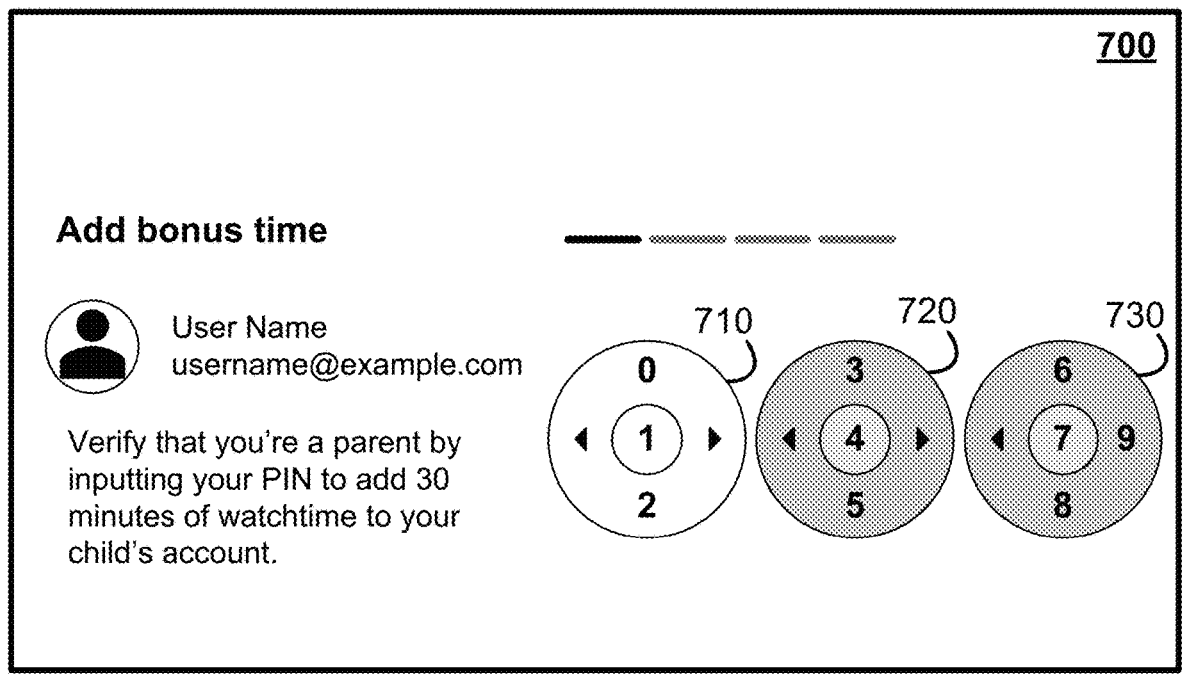
FIG. 7 shows an illustrative example of a PIN entry interface screen that includes multiple virtual directional pad interfaces that each correspond to a sequence of numerical characters in accordance with some implementations of the disclosed subject matter.

For example, FIG. 7 shows an illustrative PIN entry interface 700 that includes a first virtual directional pad interface 710, a second virtual directional pad interface 720, and a third virtual directional pad interface 730 can be presented. In continuing this example, first virtual directional pad interface 710 can be used to input numbers in the range of 0-2 where an up directional button on the remote control is allocated to enter the numerical character "0," a central select button on the remote control is allocated to enter the numerical character "1," and the down directional button on the remote control is allocated to enter the numerical character "2." It should be noted that, in this implementation, PIN pad 540 has been omitted from PIN entry interface 700.

It should be noted that, although FIGS. 5A-5H illustrate an indication of an active row or subset of numerical characters of PIN pad 540 by using highlight region 550, this is merely illustrative and active regions or subsections within PIN entry interfaces can be highlighted in any suitable manner. For example, FIG. 7 illustrates that a virtual directional pad interface can be highlighted to indicate that it is active for selecting numerical characters and/or functional options. As shown, first virtual directional pad interface 710 is highlighted to indicate that the user can use the remote control to select a number from the range of 0-2 for inputting into the first digit of the PIN.

It should be noted that, although FIGS. 5A-5H illustrate navigation between rows of PIN pad 540 by pressing up and down buttons on the remote control, this is merely illustrative and PIN entry interfaces can provide users with navigation options in any suitable manner. For example, as shown in FIG. 7, the left and right buttons on the remote control can be used to navigate between virtual directional pad interfaces. In continuing this example, in response to selecting the right directional button of the remote control, the active virtual directional pad interface can be changed from first virtual directional pad interface 710 to second virtual directional pad interface 720. Alternatively, in response to selecting the left directional button of the remote control, the active virtual directional pad interface can be changed from first virtual directional pad interface 710 to an interface containing one or more functional options, such as a "Forgot PIN" option that allows the user to reset a PIN associated with the user account or a profile option that allows the user to switch between different user accounts.

In some implementations, alternatively to providing a PIN entry interface that includes a virtual directional pad interface 530 and an adjacent PIN pad 540 in FIGS. 5A-5G, the virtual directional pad interface can be integrated with the PIN pad. This can, for example, cause the integrated virtual directional pad interface to shift as the user focuses on a particular number set (e.g., the numbers 1-3, 4-6, 7-9, and 0).

Figure 8A:
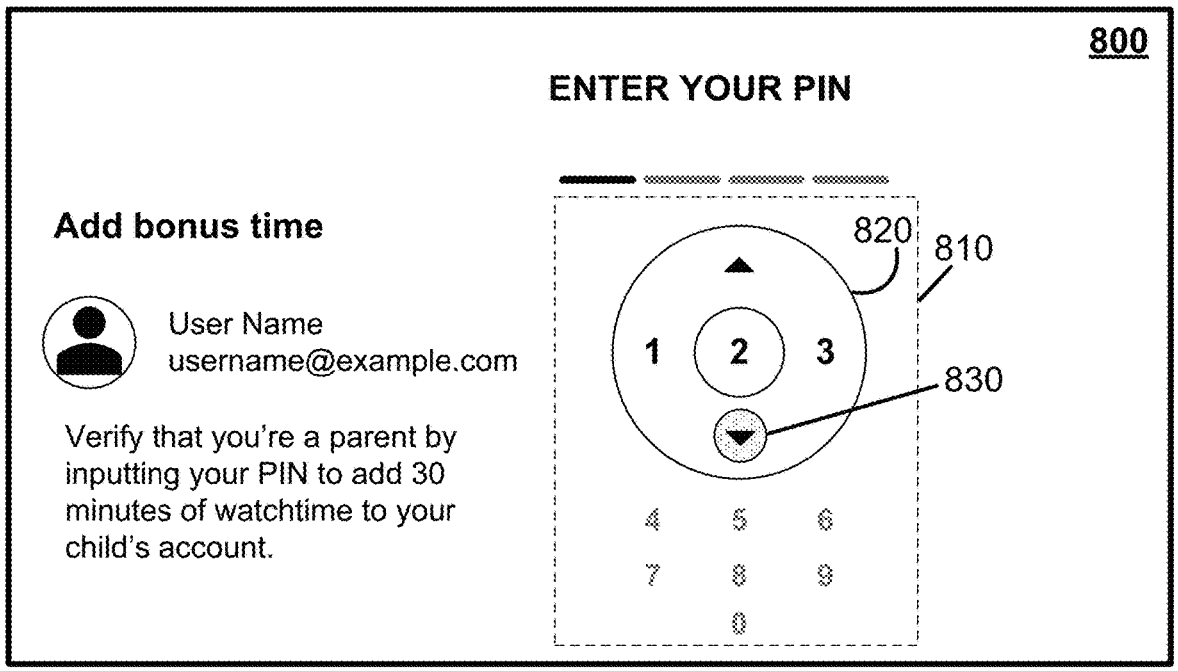
FIGS. 8A-8B show an illustrative example of a PIN entry interface screen in which a virtual directional pad interface is integrated within a PIN pad interface, where the virtual directional pad interface corresponds with the active row of the PIN pad interface, in accordance with some implementations of the disclosed subject matter.
Figure 8B:
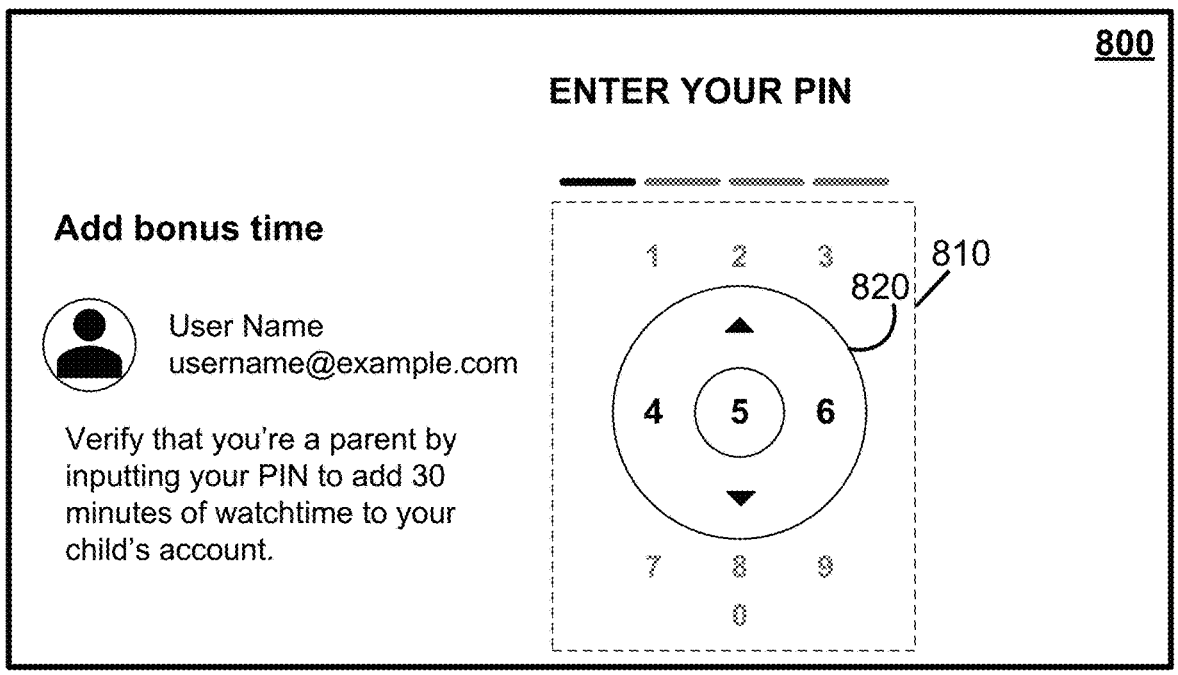

For example, FIGS. 8A and 8B show an illustrative PIN entry interface 800 that includes a PIN pad interface 810 in which a virtual directional pad interface 820 can be integrated within PIN pad interface 810. More particularly, as shown in FIG. 8A, the active row of numerical characters in the range of 1-3 in PIN pad interface 810 can be replaced with a virtual directional pad interface 810. Similar to FIGS. 5A-5G, the number "1" has been positioned over the left directional button of virtual directional pad interface 820 to indicate that pressing the left directional button on the directional pad of the remote control inputs the number "1" into the PIN, the number "2" has been positioned over the center select button of virtual directional pad interface 820 to indicate that pressing the central select button on the directional pad of the remote control inputs the number "2" into the PIN, and the number "3" has been positioned over the right directional button of virtual directional pad interface 820 to indicate that pressing the right directional button on the directional pad of the remote control inputs the number "3" into the PIN. In continuing this example, PIN pad interface 810 can present the remaining inactive rows in the PIN pad beneath virtual directional pad interface 820.

In continuing the example in FIG. 8A, in response to selecting the down directional button of the remote control (as indicated by marker 830 on virtual directional pad 820), the active row of PIN pad interface 810 can shift from a row corresponding to numbers in the range of 1-3 to an adjacent subsection corresponding to numbers in the range of 4-6. In turn, as shown in FIG. 8B, virtual directional pad 820 that represented the previously active row of numbers in the range of 1-3 in PIN pad interface 810 can be replaced with a row of numerical characters 1-3 and the newly active row of numbers in the range of 4-6 in PIN pad interface 810 can be replaced with virtual directional pad 820. As also shown in FIG. 8B, the number "4" has been positioned over the left directional button of virtual directional pad interface 820 to indicate that pressing the left directional button on the directional pad of the remote control inputs the number "4" into the PIN, the number "6" has been positioned over the center select button of virtual directional pad interface 820 to indicate that pressing the central select button on the directional pad of the remote control inputs the number "6" into the PIN, and the number "7" has been positioned over the right directional button of virtual directional pad interface 820 to indicate that pressing the right directional button on the directional pad of the remote control inputs the number "7" into the PIN.

Figure 9A:
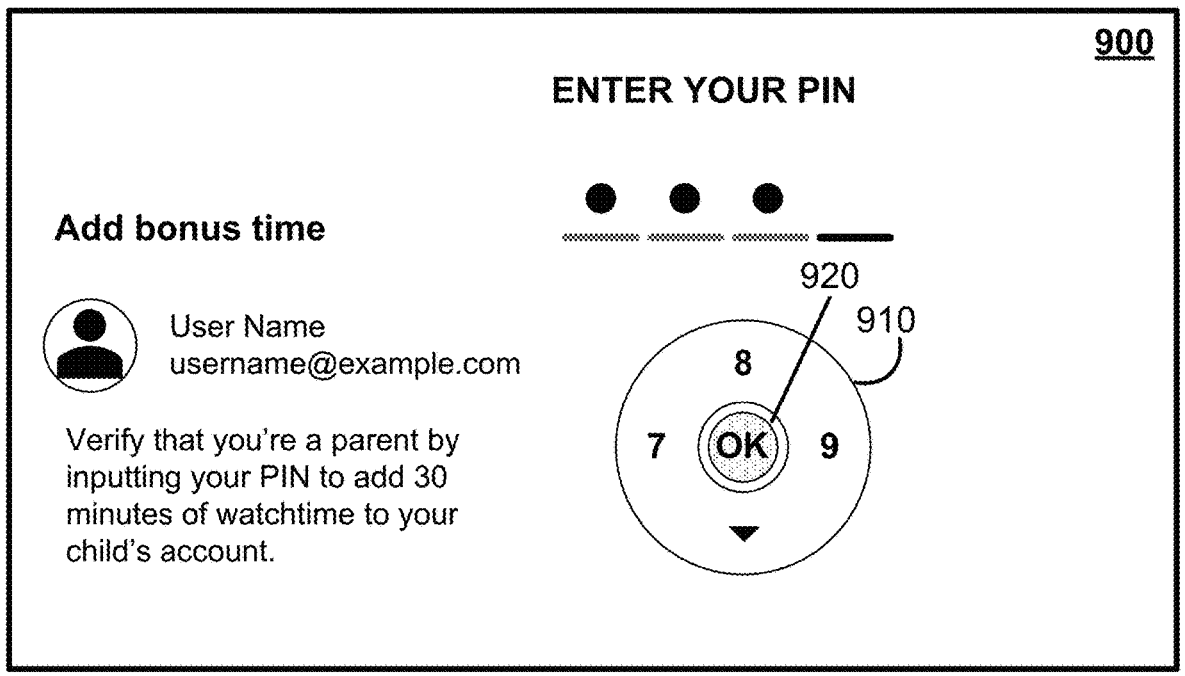
FIGS. 9A-9B show an illustrative example of a PIN entry interface screen in which a central select button of the remote control is used to navigate between rows of the PIN pad interface in accordance with some implementations of the disclosed subject matter.

In some implementations, alternatively to providing a PIN entry interface that includes a virtual directional pad interface 530 and an adjacent PIN pad 540 in FIGS. 5A-5H, the virtual directional pad interface and the PIN pad can be presented in different interfaces. For example, as shown in FIG. 9A, an illustrative PIN entry interface 900 can be presented that includes a virtual directional pad interface 910. More particularly, the number "7" has been positioned over the left directional button of virtual directional pad interface 910 to indicate that pressing the left directional button on the directional pad of the remote control inputs the number "7" as the last digit of the PIN, the number "8" has been positioned over the up directional button of virtual directional pad interface 910 to indicate that pressing the up directional button on the directional pad of the remote control inputs the number "8" as the last digit of the PIN, and the number "9" has been positioned over the right directional button of virtual directional pad interface 910 to indicate that pressing the right directional button on the directional pad of the remote control inputs the number "9" as the last digit of the PIN.

Figure 9B:
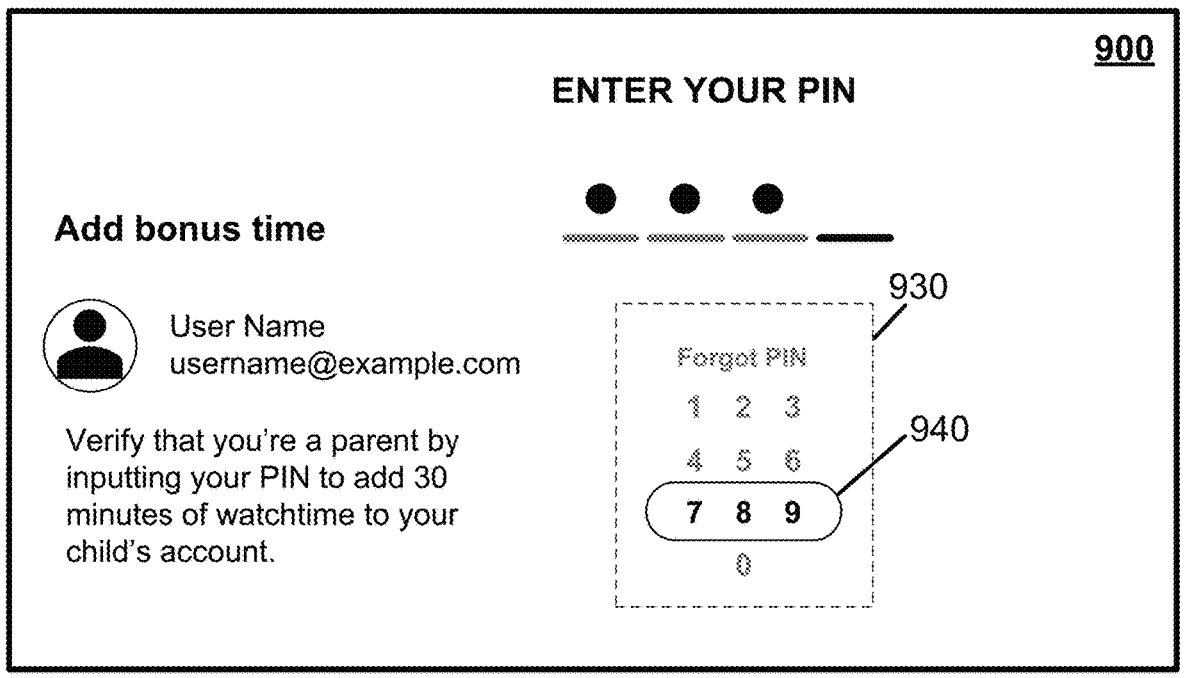

In continuing the example shown in FIG. 9A, an "OK" indicator can be positioned over the central select button of virtual directional pad interface 910. In response to selecting the central select button of the remote control (as indicated by marker 920 on virtual directional pad 910), virtual directional pad interface 910 can be replaced with PIN pad interface 930 indicating the numerical characters and/or functional options that are available for selecting in the obfuscated PIN entry mode. As also shown in FIG. 9B, a highlight region 940 can be used to indicate which row or subsection of numerical characters and/or functional options are currently active. By pressing the up and down directional buttons on the remote control, the user can navigate between subsections of numerical characters and/or functional options that can be selected by virtual directional pad interface 910. For example, in response to pressing the up directional button on the directional pad of the remote control causes the PIN pad interface 930 to navigate from a row containing numbers in the range of 7-9 to an adjacent row containing numbers in the range of 4-6.

Alternatively, in some implementations, illustrative PIN entry interface 900 can begin by presenting a PIN pad interface 930 in which the user can select a subsection of PIN pad interface 930 for inputting one or more numerical characters. In response to selecting a subsection of PIN pad interface 930, PIN entry interface 900 can be updated to present the corresponding virtual directional pad interface 910 in which the user can use the remote control to input one or more numerical characters into the PIN entry region.

In some implementations, alternatively to providing a PIN entry interface that includes a virtual directional pad interface 530 and an adjacent PIN pad 540 in FIGS. 5A-5G, the PIN entry interface can include alternate instructions for navigating between ranges of numerical characters and/or functional options for selection. For example, as shown in a PIN entry interface 1000 of FIG. 10A, each directional button and the central select button of the remote control can be allocated to input one of a range of numerical characters. More particularly, as shown in a virtual directional pad interface 1010, the number "0" has been positioned over the central select button of virtual directional pad interface 1010 to indicate that pressing the central select button on the directional pad of the remote control inputs the number "0" into the PIN, the number "1" has been positioned over the up directional button of virtual directional pad interface 1010 to indicate that pressing the up directional button on the directional pad of the remote control inputs the number "1" into the PIN, the number "2" has been positioned over the right directional button of virtual directional pad interface 1010 to indicate that pressing the right directional button on the directional pad of the remote control inputs the number "2" into the PIN, the number "3" has been positioned over the down directional button of virtual directional pad interface 1010 to indicate that pressing the down directional button on the directional pad of the remote control inputs the number "3" into the PIN, and the number "4" has been positioned over the left directional button of virtual directional pad interface 1010 to indicate that pressing the left directional button on the directional pad of the remote control inputs the number "4" into the PIN.

Figure 10A:
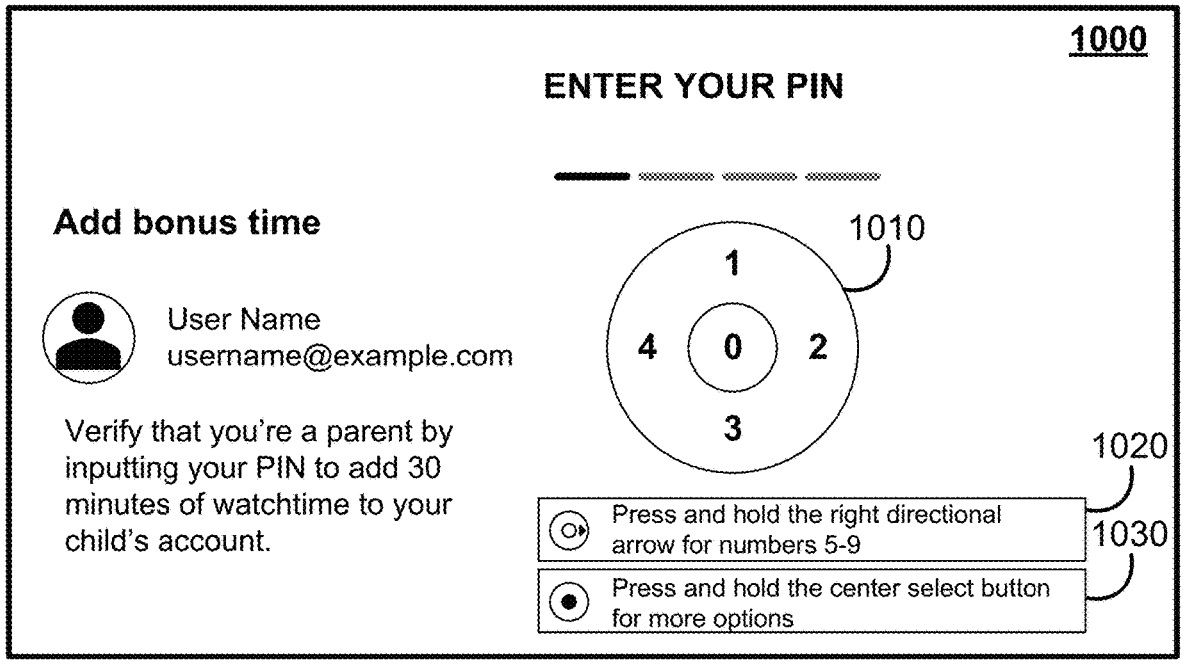
FIGS. 10A-10B show an illustrative example of a PIN entry interface screen that provides multiple press and hold gestures for navigating between rows of the PIN pad interface or for access additional functional options in accordance with some implementations of the disclosed subject matter.

In some implementations, PIN entry interface 1000 can provide remote control gestures to navigate between the current numerical characters in the range of 0-4 to numerical characters in the range 5-9. For example, as shown in FIG. 10A, notification 1020 can indicate that a press and hold gesture on the right directional arrow on the directional pad of the remote control causes the virtual directional pad interface 1010 to navigate between numerical characters in the range of 0-4 to numerical characters in the range 5-9. This is shown, for example, in FIG. 10B in which numerical characters in the range of 5-9 are positioned on the directional arrow buttons and the central select button of virtual directional pad interface 1010. In turn, notification 1040 can indicate that a press and hold gesture on the left directional arrow on the directional pad of the remote control causes the virtual directional pad interface 1010 to navigate back to numerical characters in the range of 0-4.

Figure 10B:
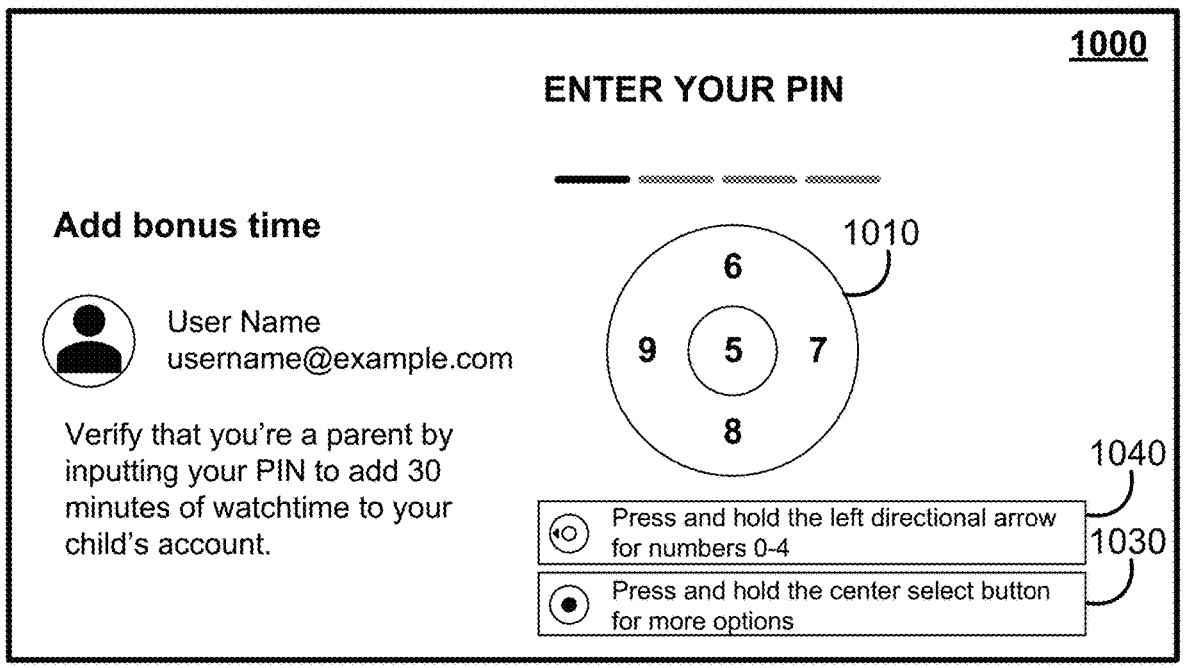
Figure 11A:
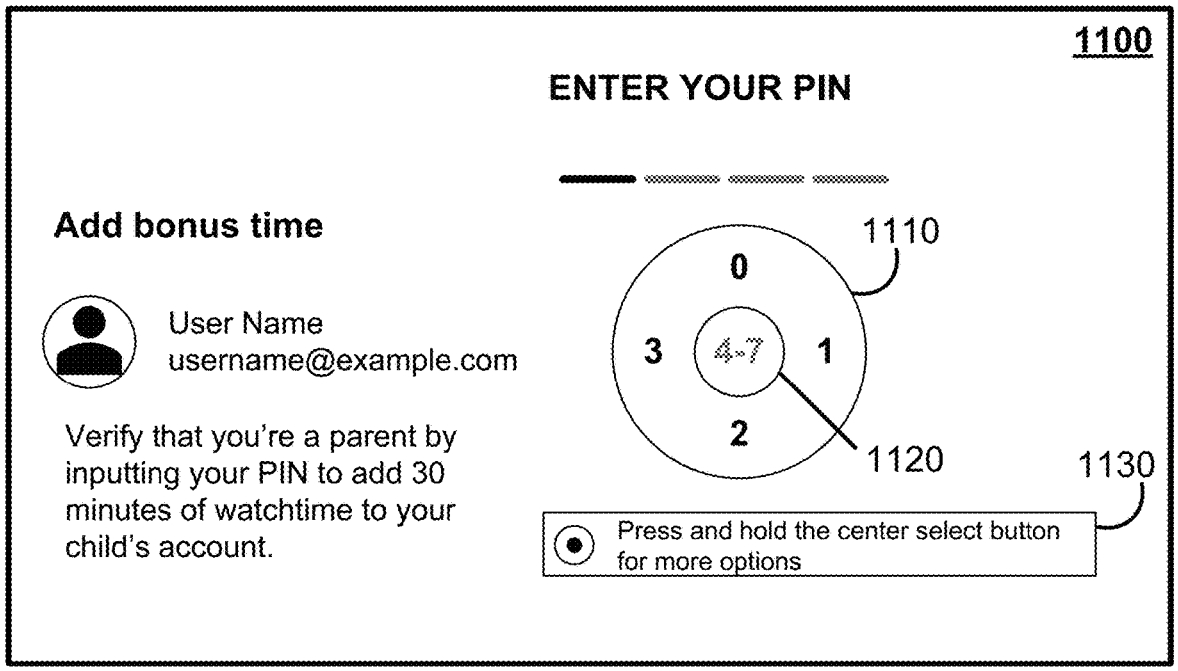
FIGS. 11A-11B show an illustrative example of a PIN entry interface screen that provides multiple press and hold gestures for navigating between rows of the PIN pad interface in accordance with some implementations of the disclosed subject matter.
Figure 11B:
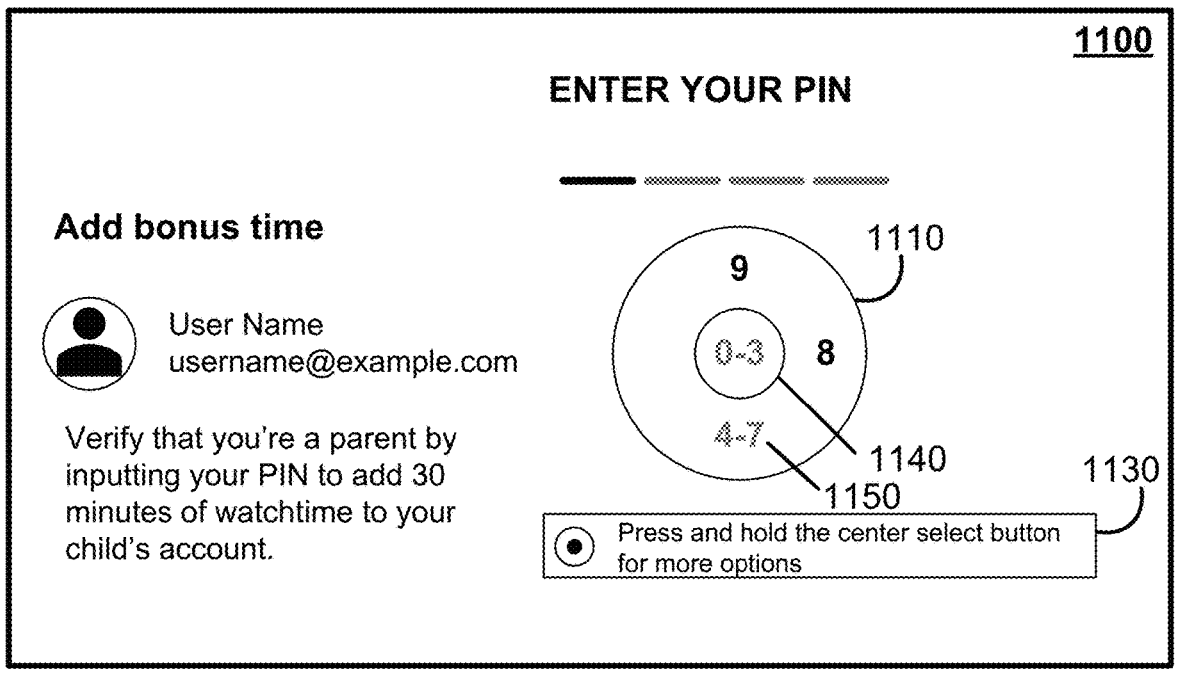

In some implementations, PIN entry interface 1000 can provide remote control gestures to navigate between the current numerical characters in the range of 0-4 and one or more functional options. For example, as shown in FIGS. 10A and 10B, notification 1030 can indicate that a press and hold gesture on the central select button of the remote control causes the virtual directional pad interface 1010 to navigate from inputting numerical characters to selecting one or more functional options (e.g., selecting a "Forgot PIN" operation).

Alternatively, in some implementations, the PIN entry interface can include alternate instructions for navigating between ranges of numerical characters and/or functional options for selection in which a button on the remote control can be allocated to perform multiple functions. For example, as shown in a PIN entry interface 1100 of FIG. 11A, virtual directional pad interface 1110 can indicate that pressing the central select button of the remote control can navigate from the numerical input range from 0-3 (e.g., as shown as being allocated to the directional buttons of the remote control) to a numerical input range of 4-7 (e.g., as indicated on the central select button of virtual directional pad interface 1110). In continuing this example, in response to pressing the central select button of the remote control, virtual directional pad interface 1110 can be updated in which the number "4" is positioned over the up directional button of virtual directional pad interface 1110 to indicate that pressing the up directional button on the directional pad of the remote control inputs the number "4" into the PIN, the number "5" is positioned over the right directional button of virtual directional pad interface 1110 to indicate that pressing the right directional button on the directional pad of the remote control inputs the number "5" into the PIN, the number "6" is positioned over the down directional button of virtual directional pad interface 1110 to indicate that pressing the down directional button on the directional pad of the remote control inputs the number "6" into the PIN, and the number "7" is positioned over the left directional button of virtual directional pad interface 1110 to indicate that pressing the left directional button on the directional pad of the remote control inputs the number "7" into the PIN. In addition, the central select button of the remote control can also be used to access functional options in the obfuscated PIN entry mode. For example, notification 1130 in FIG. 11A can indicate that a press and hold gesture on the central select button of the remote control causes the virtual directional pad interface 1110 to navigate from inputting numerical characters to selecting one or more functional options (e.g., selecting a "Forgot PIN" operation).

Alternatively, in some implementations, the PIN entry interface can include alternate instructions for navigating between ranges of numerical characters and/or functional options for selection in which multiple buttons on the remote control can be allocated to access different ranges of numerical characters. For example, as shown in PIN entry interface 1100 of FIG. 11B, virtual directional pad interface 1110 can indicate that pressing the central select button of the remote control can navigate from the numerical input range from 8-9 (e.g., as shown as being allocated to the up and right directional buttons of the remote control) to a numerical input range of 0-3 (e.g., as indicated on the central select button of virtual directional pad interface 1110) or to a numerical input range of 4-7 (e.g., as indicated on the down directional button of virtual directional pad interface 1110).

Figure 12:
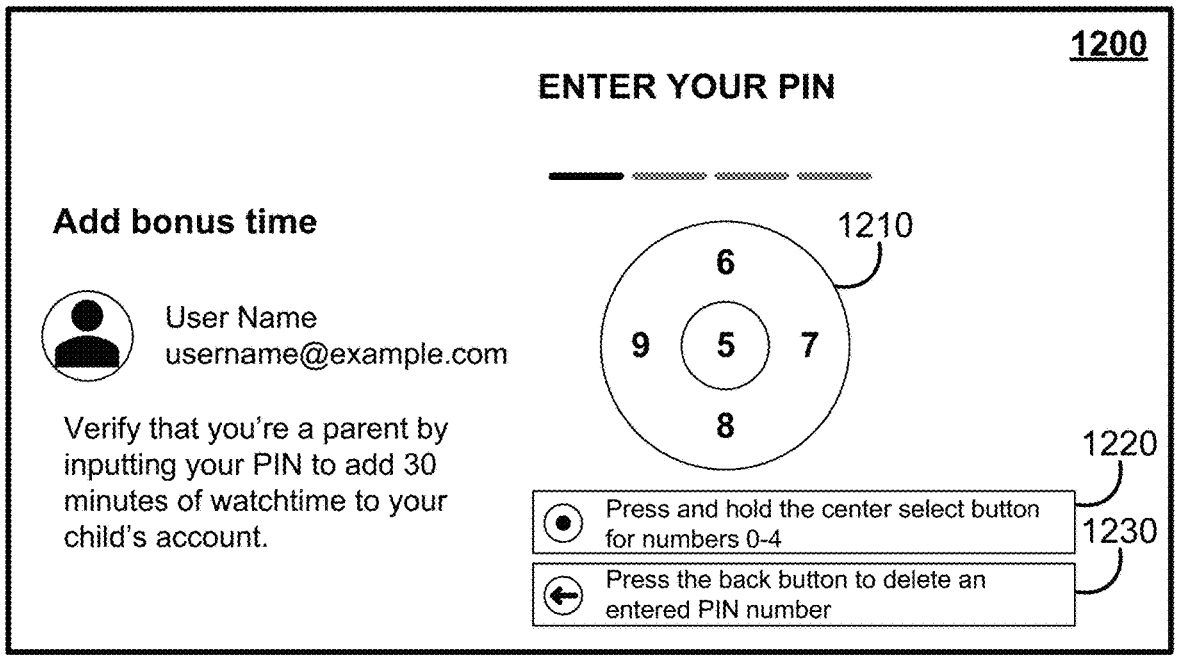
FIG. 12 shows an illustrative example of a PIN entry interface screen that provides multiple options for navigating between rows of the PIN pad interface and for deleting a previously entered numerical character in accordance with some implementations of the disclosed subject matter.

In some implementations, the PIN entry interface can include any suitable number of notifications. For example, as shown in FIG. 12, a PIN entry interface 1200 can present multiple notifications—e.g., a notification 1220 indicating that a press and hold gesture applied to the central select button of the remote control can cause a virtual directional pad interface to navigate from a current range of numerical characters to an adjacent range of numerical characters and a notification 1230 indicating that pressing a back button of the remote control causes the last entered PIN number to be deleted. It should be noted that any suitable notification can be provided, such as notifications for switching from the obfuscated PIN entry mode to a different PIN entry mode.

Figure 13:
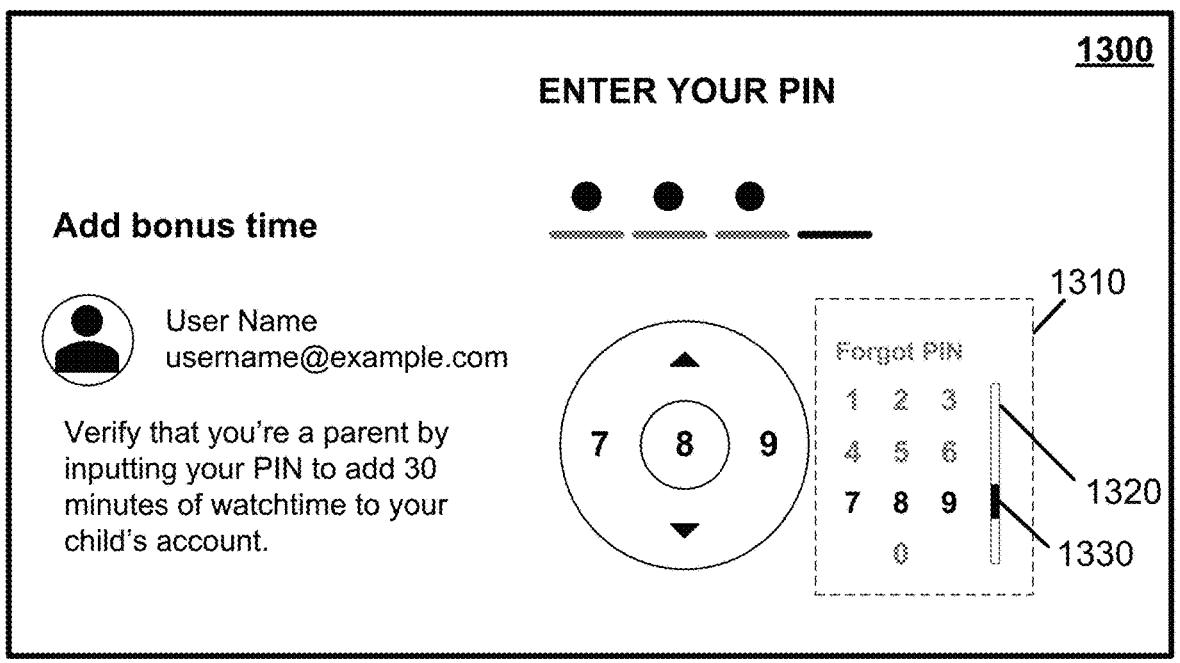
FIG. 13 shows an illustrative example of a PIN entry interfaces screen that provides a slider interface for indicating the active row of the PIN pad interface in accordance with some implementations of the disclosed subject matter.

In some implementations, although the implementations described herein generally indicate an active row of a PIN pad using a highlight region or highlighted characters, this is merely illustrative and active characters that are available for selection by the remote control can be identified in any suitable matter. For example, as shown in FIG. 13, a slider interface 1320 can be provided in connection with a PIN pad 1310. As shown, slider interface 1320 can include a slider position indicator 1330 that indicates which row of the multiple rows is active in PIN pad 1310. In particular, FIG. 13 indicates that the row which includes numerical characters in the range of 7-9 is currently active for selection using buttons on the remote control.

Figure 14A:
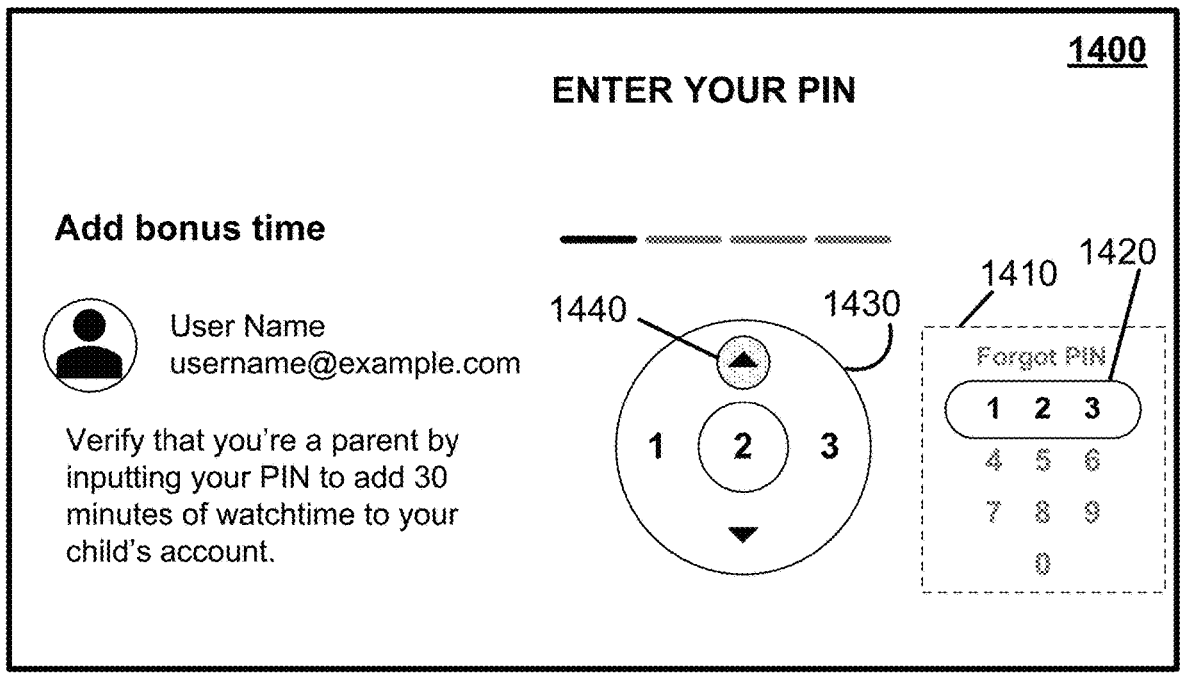
FIGS. 14A-14B show an illustrative example of a PIN entry interface screen that includes a functional option for resetting a PIN associated with a user account in accordance with some implementations of the disclosed subject matter.
Figure 14B:
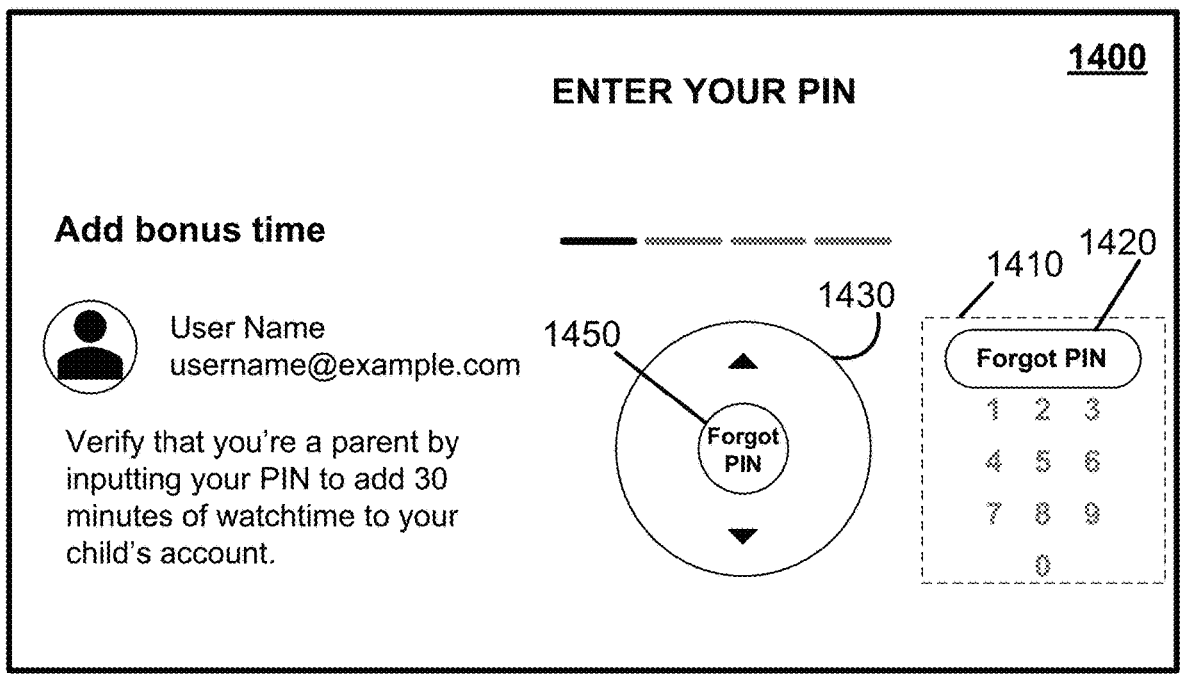

As described above, a PIN entry interface that includes a virtual directional pad interface and an adjacent PIN pad can be used to access one or more functional options. For example, referring back to FIG. 5A, in response to selecting the up directional button of the remote control (as indicated by marker 1440 on virtual directional pad interface 1430 in FIG. 14A), the active row of PIN pad 1410 which is highlighted with highlight region 1420 can be changed from a row corresponding to numbers in the range of 1-3 to a functional option to reset a PIN associated with the user account (e.g., "Forgot PIN" operation as shown by highlight region 1420 in PIN pad 1410 of FIG. 14B). In response to navigating to the "Forgot PIN" operation as shown in FIG. 14B, virtual directional pad interface 1430 can be updated in which the central select button of the remote control is allocated to initiate the "Forgot PIN" process. In continuing this example, in response to selecting the central select button of the remote control, the media device can initiate a process that allows the user to reset the PIN associated with the user account. Such a process can include verifying the identity of the user associated with the user account, providing alternate information to authenticate the user account, etc.

Any other suitable functional option can be selected by the remote control in connection with the obfuscated PIN entry mode.

Figure 15A:
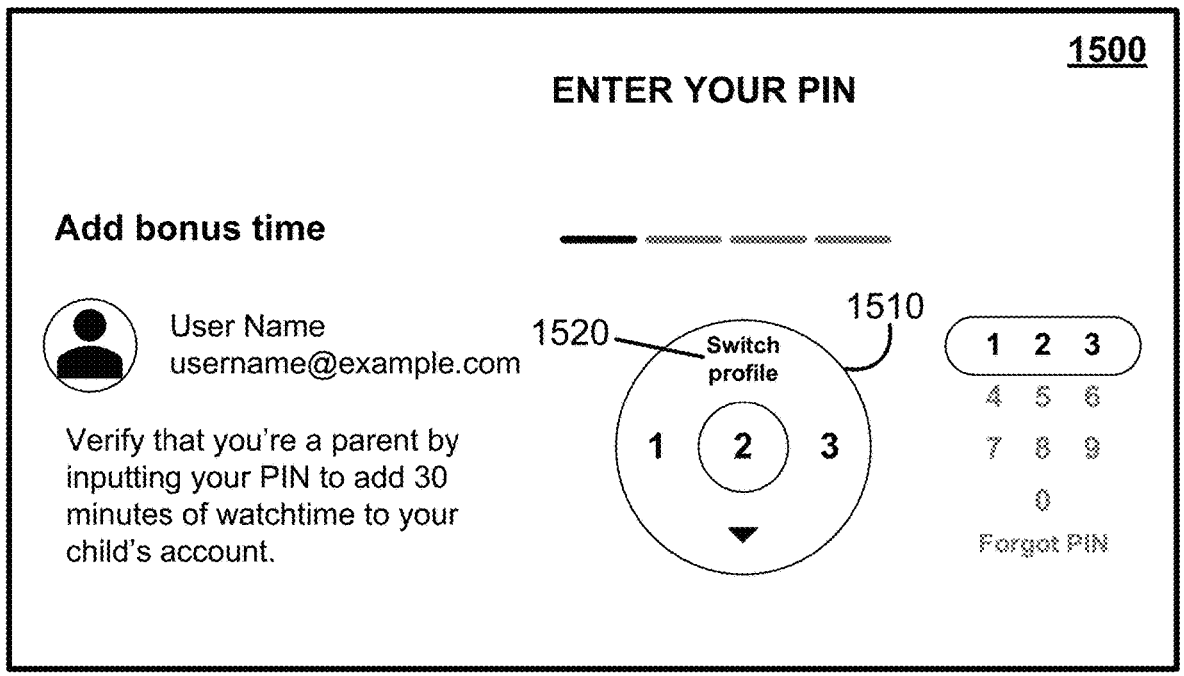
FIGS. 15A-15B show an illustrative example of a PIN entry interface screen that includes a functional option for switching between user accounts for entering a PIN in accordance with some implementations of the disclosed subject matter.
Figure 15B:
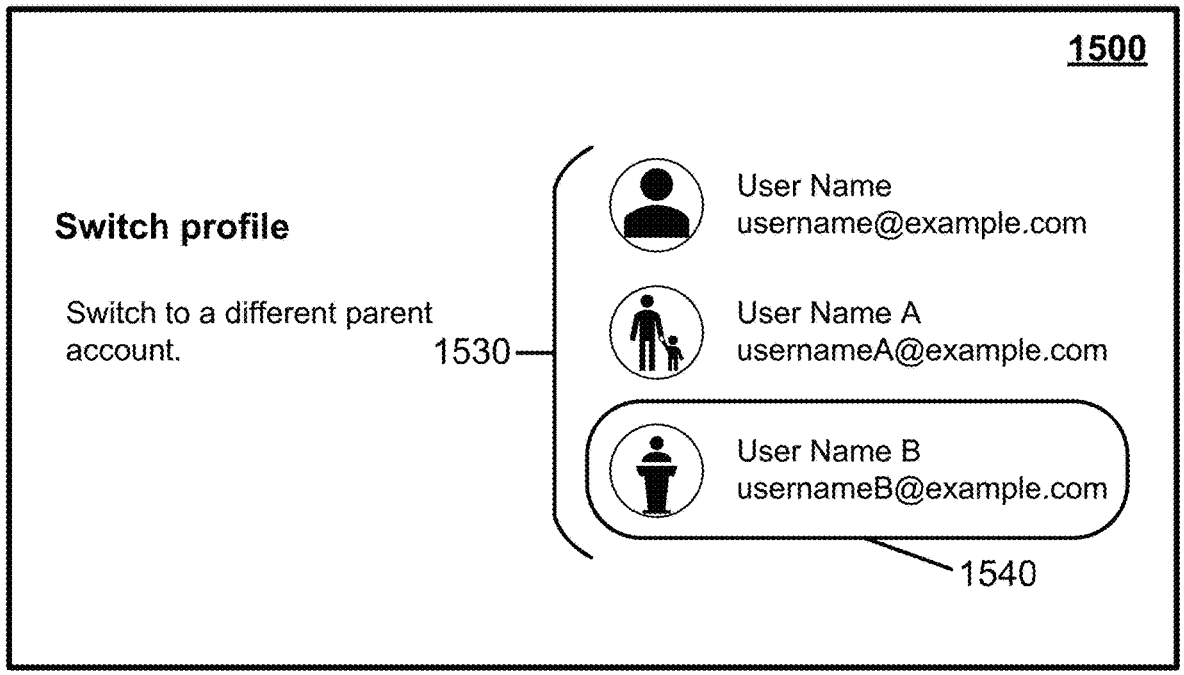

For example, as shown in FIGS. 15A and 15B, a functional option can be provided in which the user of the remote control can switch from a first user account to a second user account. In a more particular example, as shown in FIG. 15A, a virtual directional pad interface 1510 can map the up directional button of the remote control to a "switch profile" operation 1520. In response to the user selecting the up directional button of the remote control, PIN entry interface 1500 can be updated to allow the user to select between the different user accounts 1530 shown in FIG. 15B. Highlight region 1540 can be used to indicate which user account can be selected using the remote control (e.g., navigating using the directional pad and selecting using the central select button of the remote control).

Figure 16A:
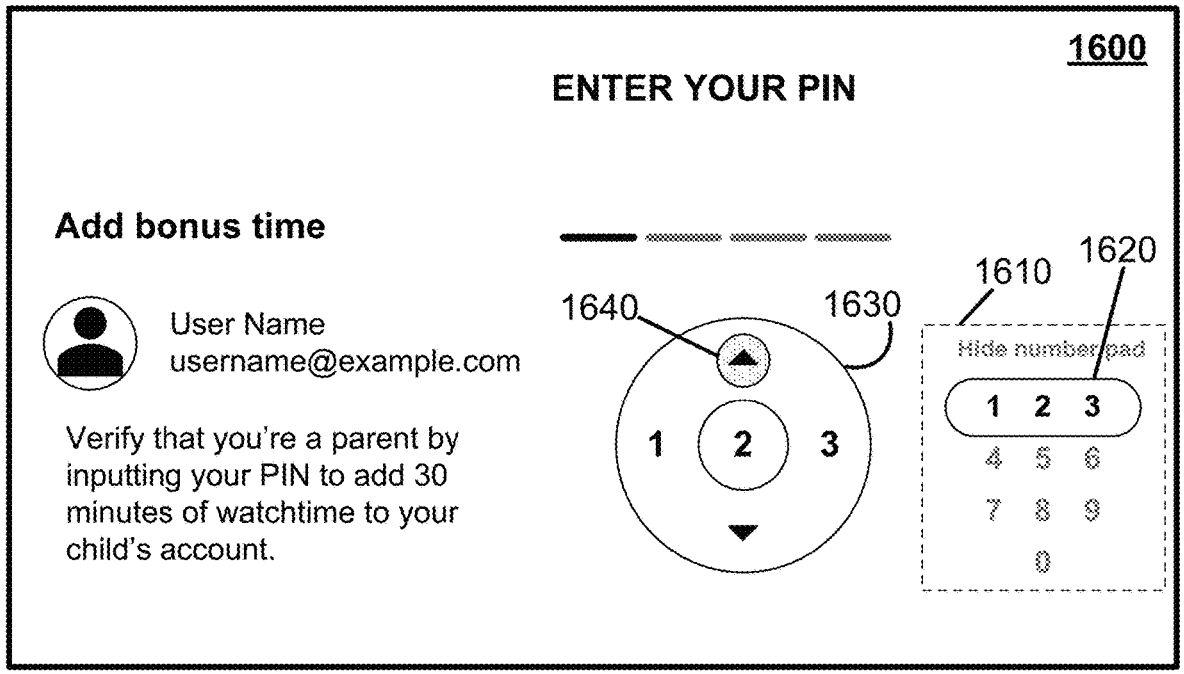
FIGS. 16A-16B show an illustrative example of a PIN entry interface screen that includes a functional option for inhibiting the PIN pad interface from being presented in accordance with some implementations of the disclosed subject matter.
Figure 16B:
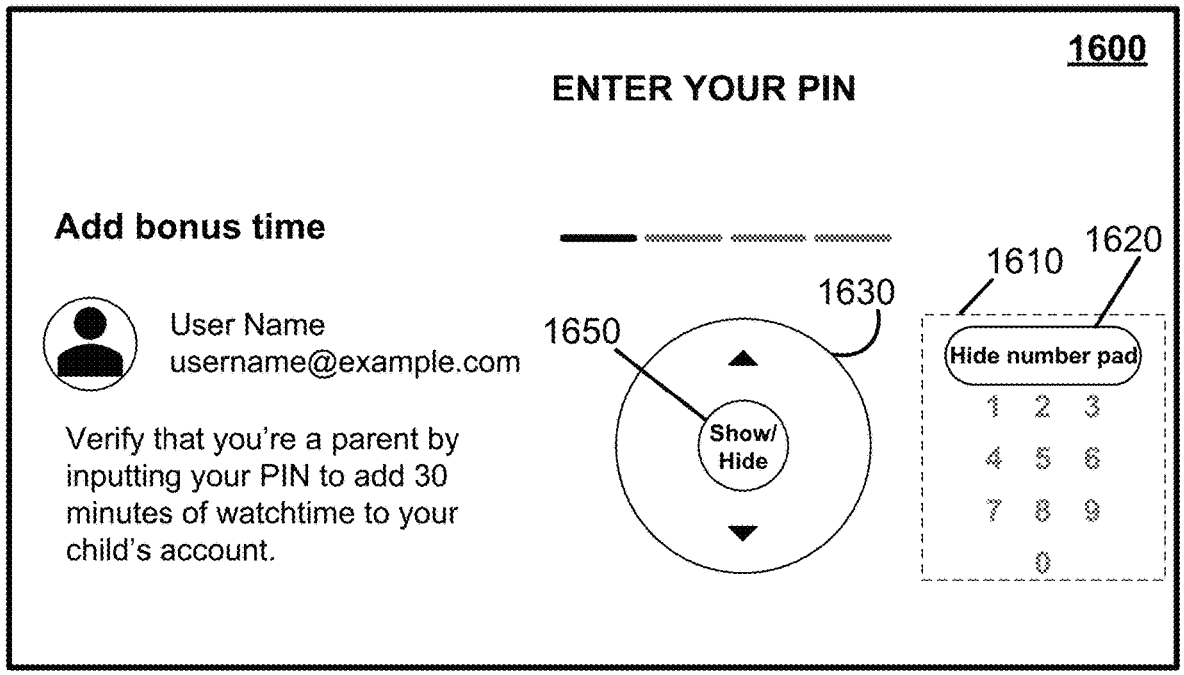

In another example, a functional option can be provided in which the user can indicate whether a PIN pad is presented in a PIN entry interface. For example, referring back to FIG. 5A, in response to selecting the up directional button of the remote control (as indicated by marker 1640 on virtual directional pad interface 1630 in FIG. 16A), the active row of PIN pad 1610 which is highlighted with highlight region 1620 can be changed from a row corresponding to numbers in the range of 1-3 to a functional option to hide the number pad represented in PIN pad 1610 (e.g., "hide number pad" operation as shown by highlight region 1620 in PIN pad 1610 of FIG. 16B). In response to navigating to the "hide number pin" operation as shown in FIG. 16B, virtual directional pad interface 1630 can be updated in which the central select button of the remote control is allocated to initiate the "Hide number pad" process. In continuing this example, in response to selecting the central select button of the remote control, the media device can initiate a process that inhibits PIN pad 1610 from being presented in PIN entry interface 1600.

Figure 17:
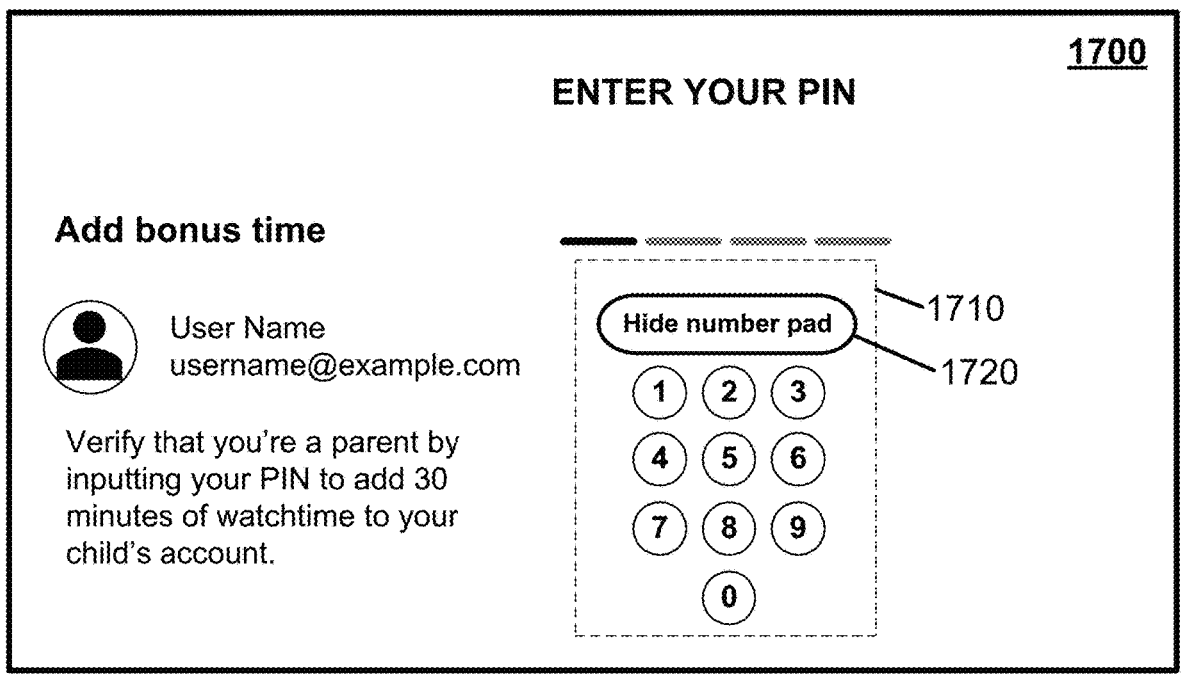
FIG. 17 shows an illustrative example of a PIN entry interface screen that includes a PIN pad in which entered numerical characters can be presented on a PIN entry region in response to key presses on the remote control in accordance with some implementations of the disclosed subject matter.

Alternatively, in response to selecting the central select button of the remote control, the media device can initiate a process that switches the obfuscated PIN entry mode to a different PIN entry mode, such as PIN entry interface 1700 of FIG. 17 that includes a number pad 1710. Number pad 1710 can, for example, indicate each inputted PIN number selected from number pad 1710. In continuing this example, in response to selecting "hide number pad" operation 1720, the media device can cause the PIN entry mode in which PIN entry interface 1700 is presented to change to the above-mentioned obfuscated PIN entry mode.

Figure 18A:
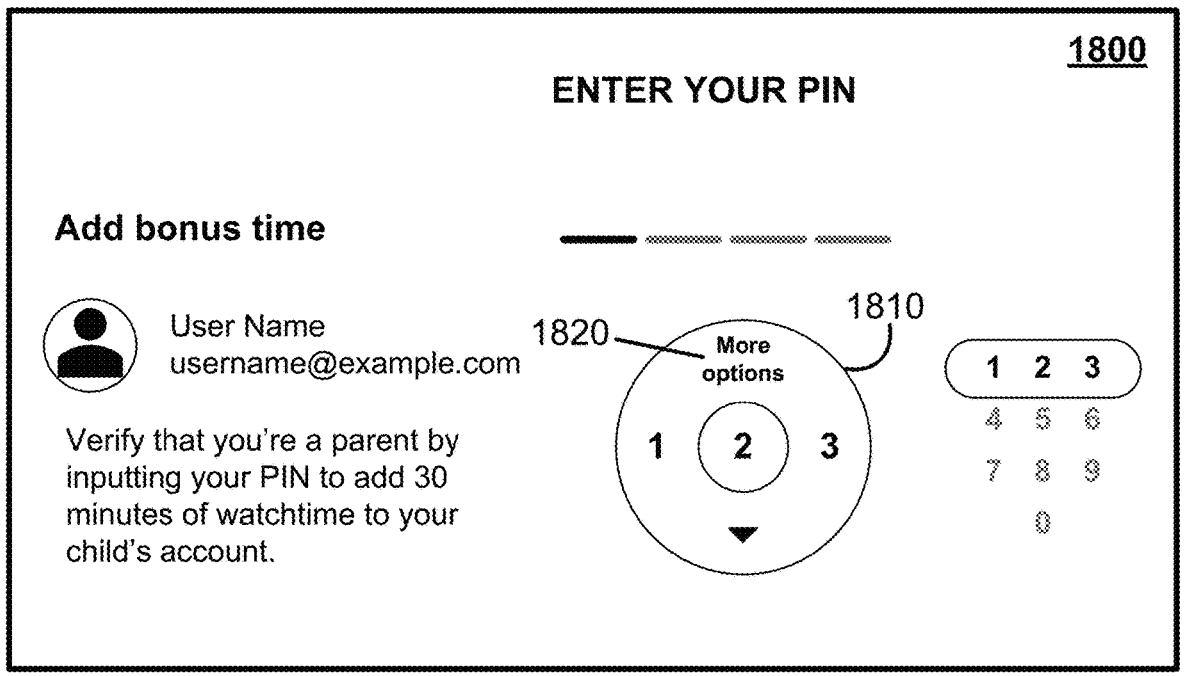
FIGS. 18A-18B shows an illustrative example of a PIN entry interface screen that includes an option for accessing multiple functional options in accordance with some implementations of the disclosed subject matter.
Figure 18B:
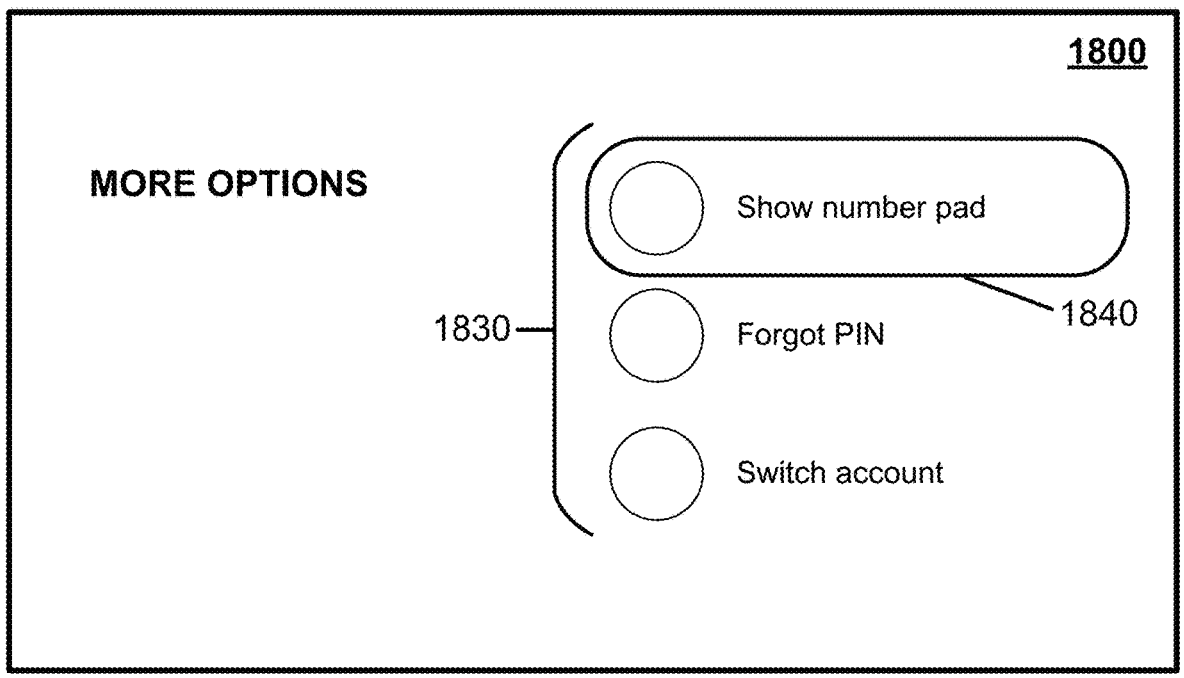

Additionally or alternatively to presenting functional options in virtual directional pad interfaces, in some implementations, the virtual directional pad interface can include an option to access multiple functional options for use in connection with the obfuscated PIN entry mode. For example, as shown in FIG. 18A, in response to selecting the up directional button of the remote control (as indicated by "more options" 1820 on virtual directional pad interface 1810 in FIG. 18A), virtual directional pad interface 1810 and other interface elements can be replaced with multiple functional options 1830 as shown in FIG. 18B. These functional options 1830 can include, for example, an operation that shows or hides the PIN pad, an operation that switches between an obfuscated PIN entry mode and another PIN entry mode, an operation that allows a user associated with the user account to reset a PIN, an operation that allows a user of the remote control to switch from one user account to another user account, etc.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, systems, methods, and media for obfuscated personal identification number entry on media devices are provided.

In some implementations, any suitable computer readable media can be used for storing instructions for performing the processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), non-transitory forms of electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes described in connection with FIG. 3 can be executed or performed in any order or sequence not limited to the order and sequence shown and described in the figure. Also, some of the above steps of the process of FIG. 3 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed:

1. A method for personal identification number entry on media devices, the method comprising:
    receiving, using a hardware processor of a media device, a request to enter a personal identification number (PIN) using a remote control device that is connected to the media device;
    in response to receiving the request to enter the PIN, determining whether an obfuscated PIN entry mode is suitable for entering the PIN on the media device based on at least one of device data and geographic location data;
    in response to determining that the obfuscated PIN entry mode is suitable for entering the PIN on the media device, causing, using the hardware processor, a PIN entry interface screen that includes (i) a PIN pad in which a plurality of numerical characters and one or more functional options are divided into a plurality of subsections and (ii) a virtual directional pad interface that corresponds to a directional pad having a plurality of directional buttons and a central select button on the remote control device, wherein the virtual directional pad interface allocates a first subset of the plurality of directional buttons and a central select button on the remote control device to an active subsection of the plurality of subsections and wherein the virtual directional pad interface allocates a second subset of the plurality of directional buttons on the remote control device to navigate between each of the plurality of subsections;
    receiving, using the hardware processor, a key press from the remote control device; and
    updating, using the hardware processor, a PIN entry region on the PIN entry interface screen with a numerical character or performing a functional option from the one or more functional options that corresponds with the key press, wherein the numerical character that corresponds with the key press and the key press are inhibited from being presented on the PIN entry interface screen.

2. The method of claim 1, wherein the PIN pad is presented adjacent to the virtual directional pad interface in the PIN entry interface screen and wherein the active subsection of the plurality of subsections in the PIN pad is highlighted.

3. The method of claim 1, wherein each subsection of the plurality of subsections corresponds to a sequence of numerical characters, wherein the first subset of the plurality of directional buttons on the remote control device comprises a left button and a right button of the directional pad of the remote control device, and wherein the left directional button, the central select button, and the right directional button are each allocated to a numerical character in the sequence of numerical characters.

4. The method of claim 1, wherein the second subset of the plurality of directional buttons on the remote control device comprises an up button and a down button of the directional pad of the remote control device and wherein the up button and the down button are each allocated to a navigation to an adjacent subsection to the active subsection.

5. The method of claim 1, wherein each subsection of the plurality of subsections in the PIN pad corresponds to a row of numerical characters in the PIN pad.

6. The method of claim 1, wherein the virtual directional pad interface in the PIN entry interface screen is shaped to correspond with the directional pad on the remote control device.

7. The method of claim 1, wherein one of the plurality of numerical characters in the active subsection is presented on a representative directional button in the virtual directional pad interface.

8. The method of claim 1, wherein the virtual directional pad interface is integrated within the PIN pad and wherein the virtual directional pad interface is presented in place of the active subsection of the PIN pad.

9. The method of claim 1, wherein each of the plurality of subsections in the PIN pad is presented in the PIN entry interface screen as one of a plurality of virtual directional pad interfaces, wherein a first virtual directional pad interface is activated from the plurality of virtual directional pad interfaces, and wherein the first virtual directional pad interface corresponds with the active subsection.

10. The method of claim 1, wherein a back button of the remote control device is allocated to delete the numerical character that was last entered in the PIN entry region.

11. The method of claim 1, further comprising, in response to determining that a correct PIN has been entered into the PIN entry region, causing an action to be performed on the media device.

12. The method of claim 1, wherein the key press from the remote control device is a press and hold gesture that has been provided to the remote control device.

13. The method of claim 1, wherein, in response to receiving a press and hold gesture on a directional button on the directional pad of the remote control device, the PIN pad navigates from the active subsection to an adjacent subsection.

14. The method of claim 1, wherein the one or more functional options includes an option to switch from a first user account to a second user account for entering the PIN.

15. The method of claim 1, wherein the one or more functional options includes an option to hide the PIN pad from being presented on the PIN entry interface screen.

16. The method of claim 1, wherein the one or more functional options includes an option to replace the PIN entry interface screen with a different PIN entry interface screen in which the numerical character that corresponds with the key press is presented.

17. The method of claim 1, wherein the one or more functional options includes an option to reset the PIN associated with a user account.

18. The method of claim 1, wherein the one or more functional options includes an option to access an interface screen containing a plurality of options, wherein the plurality of options includes a first option to switch between user accounts, a second option to hide the PIN pad from being presented on the PIN entry interface screen, and a third option to reset the PIN associated with a user account.

19. A media device comprising:
a hardware processor that:
receives a request to enter a personal identification number (PIN) using a remote control device that is connected to the media device;
in response to receiving the request to enter the PIN, determines whether an obfuscated PIN entry mode is suitable for entering the PIN on the media device based on at least one of device data and geographic location data;
in response to determining that the obfuscated PIN entry mode is suitable for entering the PIN on the media device, causes a PIN entry interface screen that includes (i) a PIN pad in which a plurality of numerical characters and one or more functional options are divided into a plurality of subsections and (ii) a virtual directional pad interface that corresponds to a directional pad having a plurality of directional buttons and a central select button on the remote control device, wherein the virtual directional pad interface allocates a first subset of the plurality of directional buttons and a central select button on the remote control device to an active subsection of the plurality of subsections and wherein the virtual directional pad interface allocates a second subset of the plurality of directional buttons on the remote control device to navigate between each of the plurality of subsections;
receives a key press from the remote control device; and
updates a PIN entry region on the PIN entry interface screen with a numerical character or performing a functional option from the one or more functional options that corresponds with the key press, wherein the numerical character that corresponds with the key press and the key press are inhibited from being presented on the PIN entry interface screen.

20. A non-transitory computer-readable medium containing computer-executable instructions that, when executed by a processor, cause the processor to perform a method for personal identification number entry on media devices, the method comprising:
receiving, using a media device, a request to enter a personal identification number (PIN) using a remote control device that is connected to the media device;
in response to receiving the request to enter the PIN, determining whether an obfuscated PIN entry mode is suitable for entering the PIN on the media device based on at least one of device data and geographic location data;
in response to determining that the obfuscated PIN entry mode is suitable for entering the PIN on the media device, causing a PIN entry interface screen that includes (i) a PIN pad in which a plurality of numerical characters and one or more functional options are divided into a plurality of subsections and (ii) a virtual directional pad interface that corresponds to a directional pad having a plurality of directional buttons and a central select button on the remote control device, wherein the virtual directional pad interface allocates a first subset of the plurality of directional buttons and a central select button on the remote control device to an active subsection of the plurality of subsections and wherein the virtual directional pad interface allocates a second subset of the plurality of directional buttons on the remote control device to navigate between each of the plurality of subsections;
receiving a key press from the remote control device; and
updating a PIN entry region on the PIN entry interface screen with a numerical character or performing a functional option from the one or more functional options that corresponds with the key press, wherein the numerical character that corresponds with the key press and the key press are inhibited from being presented on the PIN entry interface screen.

* * * * *